United States Patent
Okamoto et al.

(10) Patent No.: US 7,269,479 B2
(45) Date of Patent: Sep. 11, 2007

(54) ARTICLE TRANSPORTING ROBOT

(75) Inventors: Shusaku Okamoto, Kanagawa (JP); Osamu Yamada, Nara (JP); Yoshihiko Matsukawa, Nara (JP); Tomonobu Naruoka, Kanagawa (JP); Toru Tanigawa, Osaka (JP); Satoshi Sato, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/699,342

(22) Filed: Jan. 30, 2007

(65) Prior Publication Data

US 2007/0124024 A1 May 31, 2007

Related U.S. Application Data

(63) Continuation of application No. PCT/JP2005/014052, filed on Aug. 1, 2005.

(30) Foreign Application Priority Data

Aug. 2, 2004 (JP) .............................. 2004-225221

(51) Int. Cl.
  *G05F 19/00* (2006.01)
(52) U.S. Cl. .................. 700/245; 700/246; 700/250; 700/254; 700/260; 700/261; 700/262; 318/568.12; 901/1; 901/2; 702/188
(58) Field of Classification Search ............... 700/254
  See application file for complete search history.

(56) References Cited

U.S. PATENT DOCUMENTS

| | | | |
|---|---|---|---|
| 5,202,832 A * | 4/1993 | Lisy | ............. 701/24 |
| 5,325,468 A | 6/1994 | Terasaki et al. | |
| 5,513,299 A | 4/1996 | Terasaki et al. | |
| 6,898,484 B2 * | 5/2005 | Lemelson et al. | .......... 700/245 |
| 7,187,998 B2 * | 3/2007 | Okamoto et al. | .......... 700/245 |
| 7,187,999 B2 * | 3/2007 | Okamoto et al. | .......... 700/245 |
| 7,191,035 B2 * | 3/2007 | Okamoto et al. | .......... 700/254 |
| 7,206,668 B2 * | 4/2007 | Okamoto et al. | .......... 700/245 |
| 7,209,803 B2 * | 4/2007 | Okamoto et al. | .......... 700/245 |

(Continued)

FOREIGN PATENT DOCUMENTS

JP  64-2882  1/1989

(Continued)

OTHER PUBLICATIONS

Shibata et al., Development and integration of generic components for a teachable vision-based mobile robot, 1996, IEEE, p. 230-236.*

(Continued)

*Primary Examiner*—Thomas Black
*Assistant Examiner*—McDieunel Marc
(74) *Attorney, Agent, or Firm*—Wenderoth, Lind & Ponack, L.L.P.

(57) ABSTRACT

An article transporting robot or an article transporting system includes a state recognizing means for recognizing the state of the article, a transportation method specifying means for specifying the transportation method according to the state recognized by the state recognizing means, and a transporting device for transporting the article according to the transportation method specified by the transportation method specifying means.

10 Claims, 29 Drawing Sheets

U.S. PATENT DOCUMENTS

2003/0156493 A1  8/2003  Bayer

FOREIGN PATENT DOCUMENTS

| JP | 4-167105 | 6/1992 |
| JP | 2003-524531 | 9/2003 |
| JP | 2003-346150 | 12/2003 |
| JP | 2004-249389 | 9/2004 |

OTHER PUBLICATIONS

Loos et al., ProVAR assistive robot systme architecture, 1999, IEEE, p. 741-746.*

Martens et al., A friend for assisting handicapped people, 2001, IEEE, p. 57-65.*

Song et al., KARES: intelligent rehabilitation robotic system for the Disabled and the Elderly, Oct. 29, 1998, Internet, p. 1-7.*

Y. Nishida et al., *"Measurement of Daily Human Activity Using Ultrasonic 3D Tag System"*, 20th Annual Conference of the Robotics Society of Japan, 3C18, 2002.

K. Hashimoto et al., *"Grasp Recognition With Volumetric Fitting Using Infrared Images"*, Computer Vision and Image Media vol. 135-10, pp. 55-62, 2002.

* cited by examiner

Fig.3A

| ARTICLE | DISH | | | |
|---|---|---|---|---|
| STATE | CLEAN | DIRTY | WITH FOOD PARTICLES | WITH LEFTOVERS |
| OPERATION | · ORIENTATION: FREE;<br>· SPEED: FREE | · ORIENTATION: UPWARD;<br>· SPEED: LOW SPEED | · ORIENTATION: UPWARD;<br>· SPEED: LOW SPEED | · ORIENTATION: UPWARD;<br>· SPEED: LOW SPEED |
| PLACE | CUPBOARD | SINK | RAW GARBAGE CAN | REFRIGERATOR |
| REFLECTANCE PARAMETER MATCHING DEGREE | GREATER THAN OR EQUAL TO 99% | 90%–99% | 80%–90% | LESS THAN OR EQUAL TO 80% |

Fig.3B

| ARTICLE | CUP | | |
|---|---|---|---|
| STATE | CLEAN | WITHOUT LEFTOVER DRINK | WITH LEFTOVER DRINK |
| OPERATION | • ORIENTATION: FREE;<br>• SPEED: FREE | • ORIENTATION: UPWARD;<br>• SPEED: FREE | • ORIENTATION: UPWARD;<br>• SPEED: LOW SPEED |
| PLACE | CUPBOARD | DISHWASHER | REFRIGERATOR |

Fig.3C
| ARTICLE | BOOK | |
|---------|------|---|
| STATE | NOT STACKED 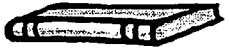 | STACKED 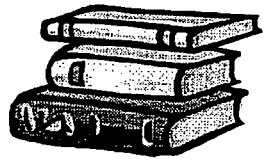 |
| OPERATION | • ORIENTATION: FREE;<br>• SPEED: FREE | • ORIENTATION: UPWARD;<br>• SPEED: LOW SPEED |
| PLACE | BOOKSHELF | USER SPECIFIED DESTINATION |

Fig.4A

| ARTICLE | CUP | | |
|---|---|---|---|
| STATE | CLEAN | WITHOUT LEFTOVER DRINK | WITH LEFTOVER DRINK |
| OPERATION | · ORIENTATION: FREE;<br>· SPEED: SPEED REGULATION 1 | · ORIENTATION: UPWARD;<br>· SPEED: SPEED REGULATION 2 | · ORIENTATION: UPWARD;<br>· SPEED: SPEED REGULATION 3 |
| PLACE | CUPBOARD | DISHWASHER | REFRIGERATOR |

Fig.5

| ARTICLE | CUP | | |
|---|---|---|---|
| STATE | CLEAN | WITHOUT LEFTOVER DRINK | WITH LEFTOVER DRINK |
| OPERATION | • ORIENTATION: FREE;<br>• SPEED: FREE | • ORIENTATION: UPWARD;<br>• SPEED: FREE | • ORIENTATION: UPWARD;<br>• SPEED: LOW SPEED |
| PLACE | CUPBOARD | DISHWASHER | REFRIGERATOR |
| NEXT STATE | — | CLEAN | — |

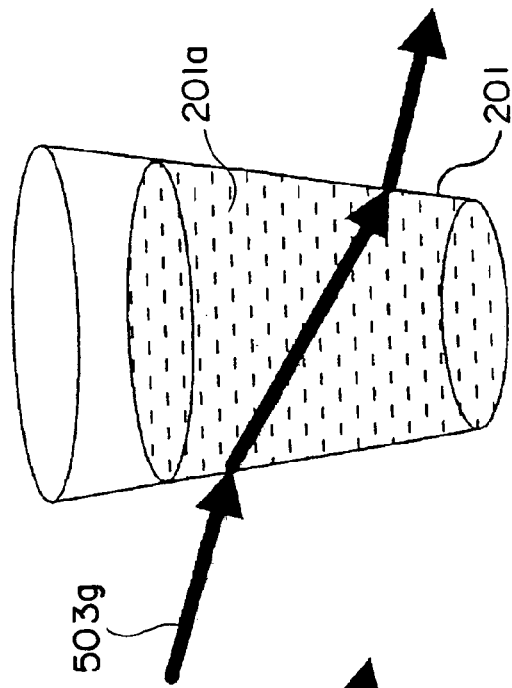
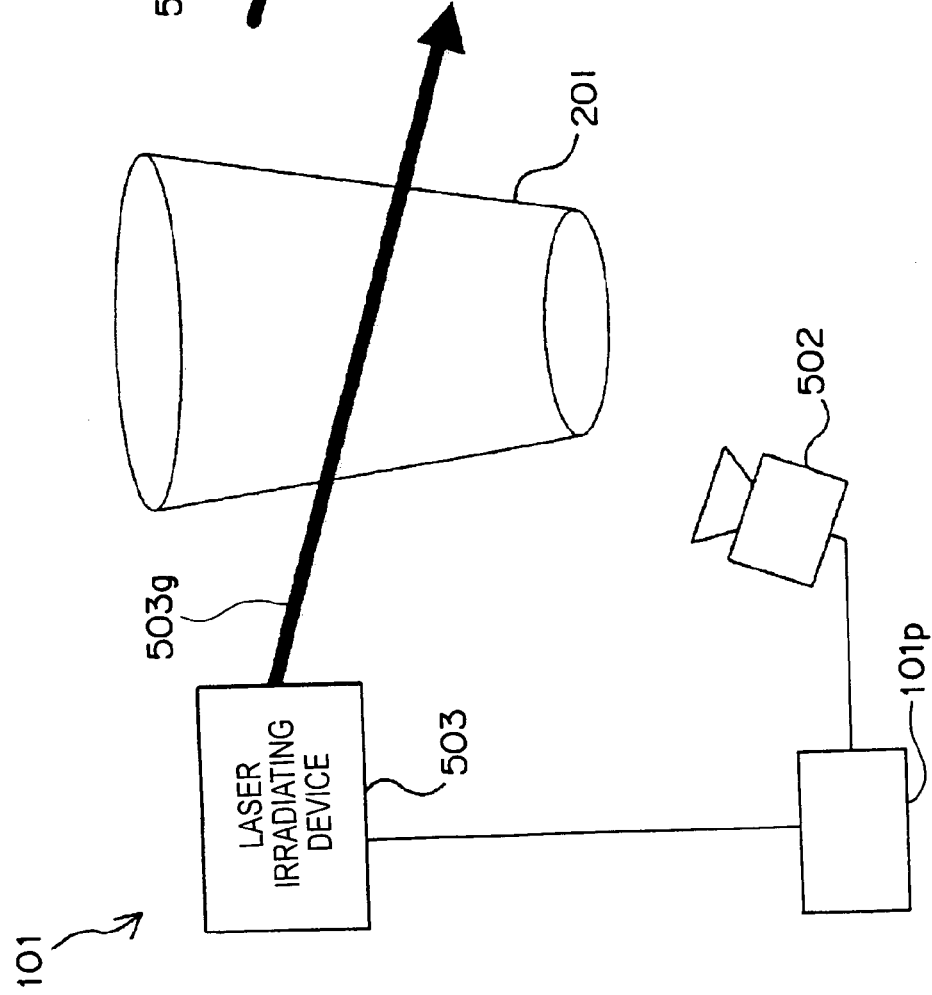
Fig.6A
Fig.6B

Fig.7F

| TR1 | TR2 | TR3 |
|---|---|---|
| TR4 | TR5 | TR6 |
| TR7 | TR8 | TR9 |

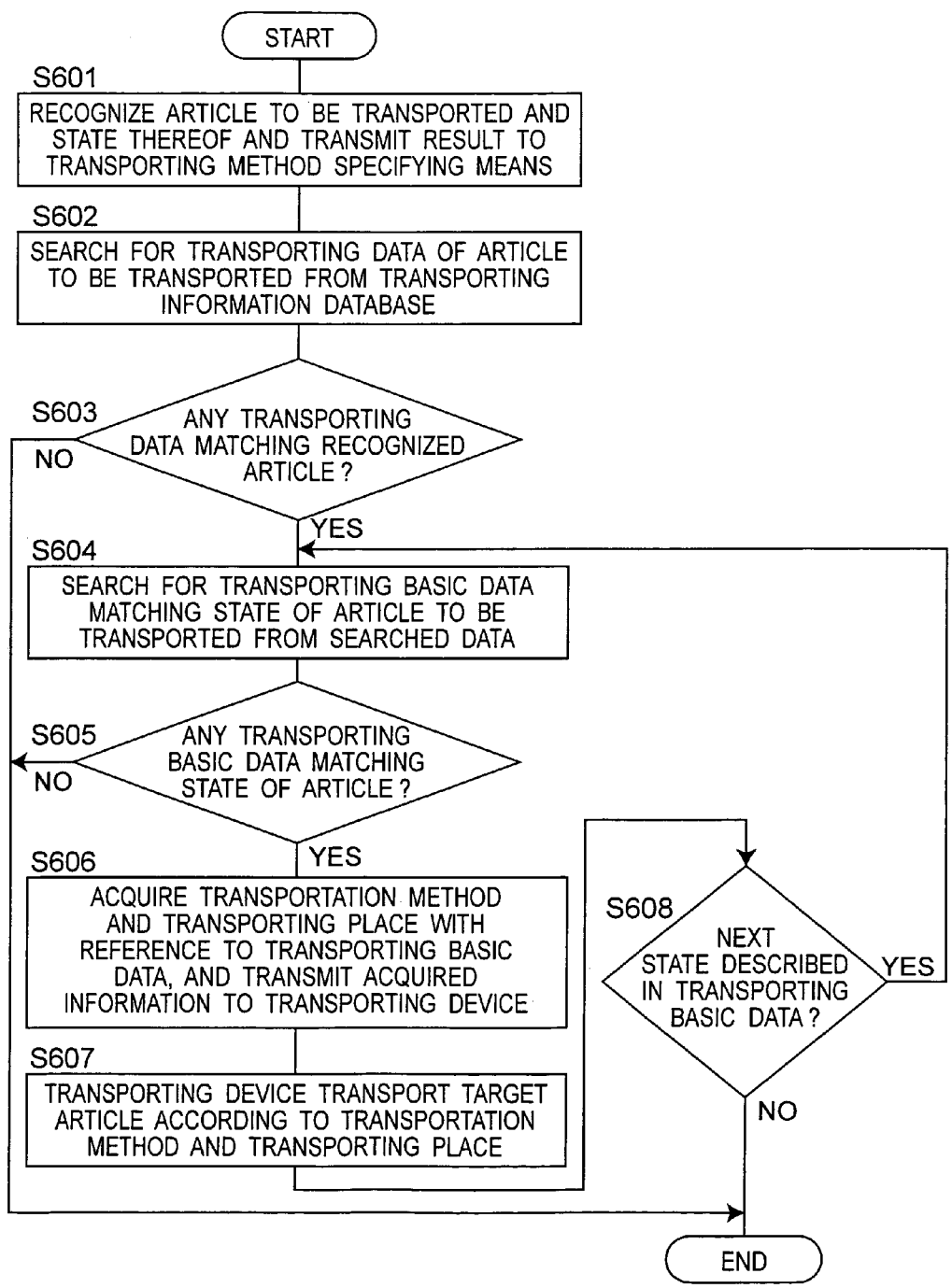

Fig. 10C
| ARTICLE | CUP (WITH CONTENT) | |
|---|---|---|
| STATE | 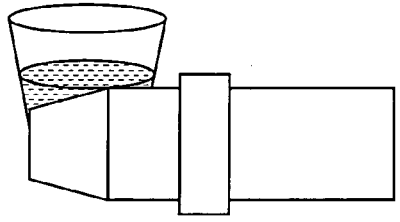 | 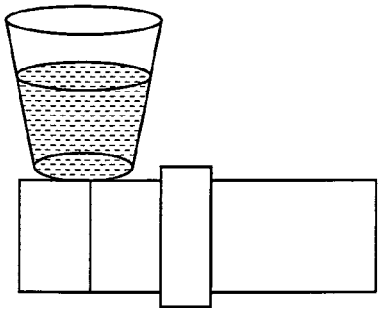 |
| OPERATION | • ORIENTATION: UPWARD;<br>• SPEED: MIDDLE SPEED | • ORIENTATION: UPWARD;<br>• SPEED: LOW SPEED |
Fig. 10D
| ARTICLE | CUP (WITH CONTENT) | |
|---|---|---|
| STATE | TEMPERATURE OF CONTENT<br>T<40°C | TEMPERATURE OF CONTENT<br>T≥40°C |
| OPERATION | • ORIENTATION: UPWARD;<br>• SPEED: MIDDLE SPEED | • ORIENTATION: UPWARD;<br>• SPEED: LOW SPEED |

ARTICLE TRANSPORTING ROBOT

This is a continuation application of International Application No. PCT/JP2005/014052, filed Aug. 1, 2005.

BACKGROUND OF THE INVENTION

The present invention relates to an article transporting robot for transporting articles.

Robots are being effectively used in various fields for the function of gripping and transporting articles. A list of examples of robots includes a robot for gripping and transporting parts in an automatic product assembly line in a factory, and a robot for transporting stocked articles in an automated storage, and the list goes on and on.

Presently, based on the robot technique matured for industrial purpose, research and development of a robot for general household are being actively performed for applications other than industrial application, in particular, for the purpose of coexisting with humans in households to support the human life. For instance, an entertainment robot for healing the human minds by behaving like pets in an environment where pets cannot be kept, and the so-called household chore supporting robot such as a robot, equipped with a large number of sensors, for cleaning rooms while avoiding the obstacles by detecting the obstacles in the room with the sensors are actually being developed and manufactured.

The factor technique essential in performing various household chore supports in a household is also being actively developed. This includes a handling technique for freely gripping and transporting various articles, a sensing technique for recognizing the state of a space where the robot moves, and the like. Robots for performing various household chores in place of humans are likely to be realized in the future with advancement in the technical development.

One of the most basic functions of the robot to perform the household chore support is a gripping function and a transporting function of articles. These functions are already realized in industrial application by a robot used in automatic product assembly line in a factory and the like, as described above. In many cases, the robot of industrial application is used in a specific environment. In particular, in mass production of few varieties of products, the correction of the program is more or less unnecessary once the operation program of the robot is set.

However, the products have diversified with diversification of user needs in the recent years, and the conventional mass production type is shifting to small production of multiple types. Thus, the parts handled by robots in the factory are frequently changed, and a demand to simplify the counter of the robot with respect to change has risen when changing the parts to be handled.

One conventional art that satisfies the above demand is a system disclosed in Japanese Unexamined Patent Publication No. 64-2882. This system includes a database that stores data corresponding the type of object (part) to be handled by the robot, and the operation information (e.g., operation control program of arm or hand) of the robot representing the method of handling the parts. This system recognizes the type of parts circulating through the line and acquires the operation information corresponding to the recognized type of the part from the database, so that the robot operates according to the operation information.

This system is characterized in that instead of adopting a method of configuring the conventional robot system in which all the operations performed by the robot are incorporated in the program, the robot is simply ranked as a machine that can be externally controlled, wherein the operation information for operating the robot is held outside and the operation information is switched according to the article handled by the robot. That is, in Japanese Laid-Open Patent Publication No. 64-2882, a concept of a system separating the robot main body and the robot operating program is suggested, which system has a very high utility value in the industrial field.

Large issues arise when applying the above system to the household robot as described below.

That is, since the system disclosed in Japanese Unexamined Patent Publication No. 64-2882 is for industrial application, even if there are various types of articles handled (transported) by the robot, only one transportation method is set for each article. However, since the state of the article in the general household and the like changes, it may not be countered with only one transportation method.

This will be explained with a specific example. Consider a case in which the transporting object is a cup. A cup takes two states in the general household etc. of "containing drink" or "not containing drink". If the transportation method corresponding to the state of "not filled with drink" is only set, when attempting to transport the cup "filled with drink", the cup cannot be held with the set transportation method as the cup is heavy, or the drink in the cup may spill out during transportation due to the setting of holding orientation or transportation speed and the like of the cup. Further, there is a disadvantage in that the cup is always transported to the same location irrespective of the presence of drink inside where it is desirable to transport the cup to the cupboard Cb when not containing drink and to the refrigerator Rg when containing drink.

Consider a different case in which the transporting object is a table ware (e.g. plate). That is, the robot attempts to perform the work of cleaning away dishes after meal. The table ware after meal takes various states such as "dirty", "with leftovers", and the like. Thus, it is desirable to perform the clean-away work according to the state of the table ware. The work includes transporting the table ware without leftovers to the dish washer Dw, and the table ware with leftovers first to the raw garbage can Gb to dispose the leftovers and then to the dish washer Dw. However, since only one transportation method is set for the table ware, the transporting location cannot be switched according to the state of the table ware.

That is, the issue that arises when applying the system disclosed in Japanese Unexamined Patent Publication No. 64-2882 to the general household and the like is that the transportation method of the article cannot be changed according to the change in the state thereof, where the state of the article changes from moment to moment in the general household and the like.

An object of the present invention is to provide, in view of the above, an article transporting robot capable of transporting the article with a most suitable transportation method according to the change in the condition, when the condition of the article is changed.

SUMMARY OF THE INVENTION

The present invention has the following configuration in order to achieve the above object.

According to the first aspect of the present invention, there is provided an article transporting robot for transporting an article in which an ID of the article in a living space is same but the article has different transportation methods in accordance with conditions of the article, the article transporting robot comprising:

a condition recognizing means for recognizing the condition of the article to be transported;

a transportation method specifying means for specifying the transportation method of the article according to the condition of the article recognized by the condition recognizing means;

a transporting device for transporting the article to be transported according to the transportation method specified by the transportation method specifying means; and a transporting information database for storing transporting information corresponding the condition and the transporting operation of the placed or accommodated object, for every placing or accommodating condition of the object of the article, wherein the transporting information further includes information regarding a next condition of the article changed as a result transporting the article to a transporting location by the transporting device, the transportation method specifying means specifies the transporting information corresponding to the condition of the article with reference to the transporting information database, and after selecting the transporting information corresponding to the condition of the recognized article, further selects different information corresponding to the next condition based on the information on the next condition contained in the selected transporting information, and the transporting device further performs transportation of the article according to the different transporting information when the different transporting information is selected.

According to a second aspect of the present invention, there is provided an article transporting robot for transporting an article in which an ID of the article in a living space is same but the article has transportation methods in accordance with conditions of the article, the article transporting robot comprising:

a condition recognizing means for recognizing the condition of the article to be transported;

a transportation method specifying means for specifying the transportation method of the article according to the condition of the article recognized by the condition recognizing means; and a transporting device for transporting the article to be transported according to the transportation method specified by the transportation method specifying means; wherein the article to be transported has a function of placing or accommodating an object, and the condition recognizing means recognizes whether or not the article to be transported is placed with or accommodating the object.

According to the article transporting robot of the present invention, since the condition of the article to be transported is recognized and the article is transported after the transportation method is specified according to the recognized result, when the condition of the article changes, the article can be transported at the most suitable transportation method corresponding to the relevant state.

BRIEF DESCRIPTION OF THE DRAWINGS

These and other aspects and features of the present invention will become clear from the following description taken in conjunction with the preferred embodiments thereof with reference to the accompanying drawings, in which:

FIG. 3A is a view showing one example of data (transporting data set with respect to a plate) stored in a transporting information database of the article transporting system or the article transporting robot according to the embodiment of the present invention;

FIG. 3B is a view showing one example of the data (transporting data set for the cup) stored in the transporting information database of the article transporting system or the article transporting robot according to the embodiment of the present invention;

FIG. 3C is a view showing an example of the data (transporting data set for the book) stored in the transporting information database of the article transporting system or the article transporting robot according to the embodiment of the present invention;

FIG. 4A is a view showing another example of the data (transporting data set for the cup) stored in the transporting information database of the article transporting system or the article transporting robot according to the embodiment of the present invention;

FIG. 5 is a view showing another further example of the data stored in the transporting information database of the article transporting system or the article transporting robot according to the embodiment of the present invention;

FIG. 6A is an explanatory view showing an example of a state recognizing means using a laser beam of the article transporting system or the article transporting robot according to the embodiment of the present invention;

FIG. 6B is an explanatory view showing an example of the state recognizing means using the laser beam of the article transporting system or the article transporting robot according to the embodiment of the present invention;

FIG. 7F is an explanatory view showing an example of a state recognizing means using a tag reader in the article transporting system or the article transporting robot according to the embodiment of the present invention;

FIG. 9 is a flowchart showing the article transporting process of the article transporting system or the article transporting robot according to the embodiment of the present invention;

FIG. 10C is a view showing the article information database of when changing the transportation method depending on the gripping method of the cup with water in the article transporting system or the article transporting robot according to the embodiment of the present invention; and FIG. 10D is a view showing the article information database of when changing the transportation method depending on the temperature of the water in a china cup in the article transporting system or the article transporting robot according to the embodiment of the present invention.

DETAILED DESCRIPTION OF THE PREFERRED EMBODIMENTS

Figure 1A:
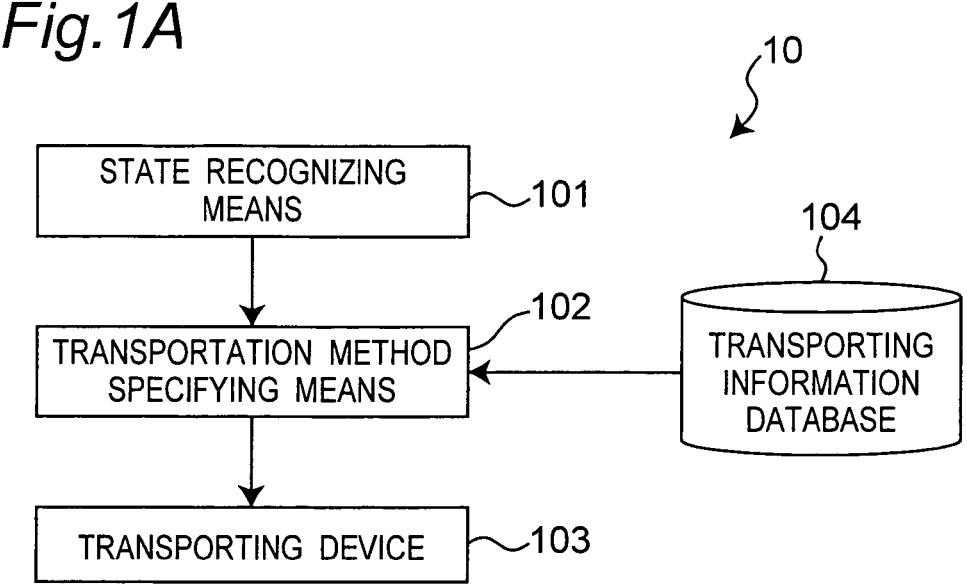
FIG. 1A is a block diagram showing an article transporting robot or an article transporting system according to a first embodiment of the present invention.

Before the description of the present invention proceeds, it is to be noted that like parts are designated by like reference numerals throughout the accompanying drawings.

Various aspects of the present invention will now be described before explaining the embodiments of the present invention.

According to the first aspect of the present invention, there is provided an article transporting robot for transporting an article in which an ID of the article in a living space is same but the article has difference transportation methods in accordance with the conditions of the article; the article transporting robot comprising:

a condition recognizing means for recognizing the condition of the article to be transported;

a transportation method specifying means for specifying the transportation method of the article according to the condition of the article recognized by the condition recognizing means;

a transporting device for transporting the article to be transported according to the transportation method specified by the transportation method specifying means.

According to the second aspect of the present invention, there is provided the article transporting robot according to the first aspect, further including a transporting information database for storing transporting information corresponding the condition and a transporting operation and/or a transporting location for every condition of each article, wherein the transportation method specifying means specifies the transporting information corresponding to the condition of the article with reference to the transporting information database.

According to the third aspect of the present invention, there is provided the article transporting robot according to the second aspect wherein the transporting information further includes information regarding a next condition of the article changed as a result of transporting the article to a transporting location by the transporting device, the transportation method specifying means, after selecting the transporting information corresponding to the condition of the recognized article, further selects different transportation information corresponding to the next condition based on the information on the next condition contained in the selected transporting information; and the transporting device further transports the article according to the different transporting information when the different transporting information is selected.

According to a fourth aspect of the present invention, there is provided the article transporting robot according to the first aspect, wherein the article to be transported has a function of placing or accommodating an object; and the condition recognizing means recognizes a condition of whether or not the article to be transported is placed with or accommodating the object.

According to a fifth aspect of the present invention, there is provided the article transporting robot according to the first aspect wherein the condition recognizing means recognizes a condition of whether or not another article is stacked on the article to be transported.

According to a sixth aspect of the present invention, there is provided an article transporting system for outputting a transporting command of an article to a robot for transporting the article in which an ID of the article in a living space is same but the article has difference transportation methods in accordance with the conditions of the article, the article transporting system comprising:

a transporting information database for storing transporting information corresponding the condition and a transporting operation and/or a transporting location for every condition of the article to be transported; and a transportation method specifying means for specifying the transportation method of the article with reference to the transporting information database according to the condition when receiving a recognized result from the condition recognizing means for recognizing the condition of the article to be transported; wherein the transporting command is output to the robot based on the transportation method specified by the transportation method specifying means with reference to the transporting information database.

According to a seventh embodiment of the present invention, there is provided an article transporting method for transporting the article with a robot in which an ID of the article in a living space is same but the article having different transportation methods in accordance with conditions of the article, the article transporting method comprising of:

recognizing the condition of the article to be transported;

specifying the transportation method of the article according to the condition of the article which condition of the article is recognized; and performing the transportation of the article to be transported with the robot according to the specified transportation method.

According to an eighth embodiment of the present invention, there is provided the article transporting robot according to the first aspect wherein the transportation method of the article changes and further the transporting location changes depending on the condition of the article.

According to a ninth embodiment of the present invention, there is provided the article transporting robot according to the first aspect further including a holding device for holding the article, wherein the article is transported while the article is being held by the holding device.

According to a tenth embodiment of the present invention, there is provided the article transporting robot according to the first aspect wherein when the article to be transported is a dish, the article transporting robot functions as a robot for performing work of clearing away the dish after meal, and the transporting location and the transportation method change between a condition in which the dish is dirty and a condition in which the dish is clean.

The embodiments of the present invention will now be described with reference to the drawings.

(Overall Configuration Of an Article Transporting Robot)

FIG. 1A shows a configuration view of an article transporting robot 10 or an article transporting system 10 according to a first embodiment of the present invention. The article transporting robot or the article transporting system 10 includes a state recognizing means 101, a transportation method specifying means 102, a transporting device 103, and a transporting information database 104, where the state recognizing means 101, the transporting device 103, and the transporting information database 104 are connected to the transportation method specifying means 102. Such article transporting robot or the article transporting system 10 is an article transporting robot or an article transporting system 10 that transports articles in place of humans in a space where humans carry out living (hereinafter referred to as living space) such as general households, offices, hotels, stores, or hospitals, and either transports articles when receiving a work command from the user or transports articles automatically when the article transporting robot or the article transporting system 10 decides on the state in the living space. An example of when automatically transporting the articles includes automatically clearing away the article when the article is left in the living space for a long period of time. The configuration of the article transporting robot or the article transporting system 10 targeted for the general household will now be explained below. FIG. 2B is a floor plan of a room serving as one example of the living space where the article is transported by the article transporting robot or the article transporting system 10, where Dw is a dish washer, Ks is a sink, Gb is raw garbage can, Rg is a refrigerator, Cb is a cupboard, and Tb is a table.

Figure 1B:
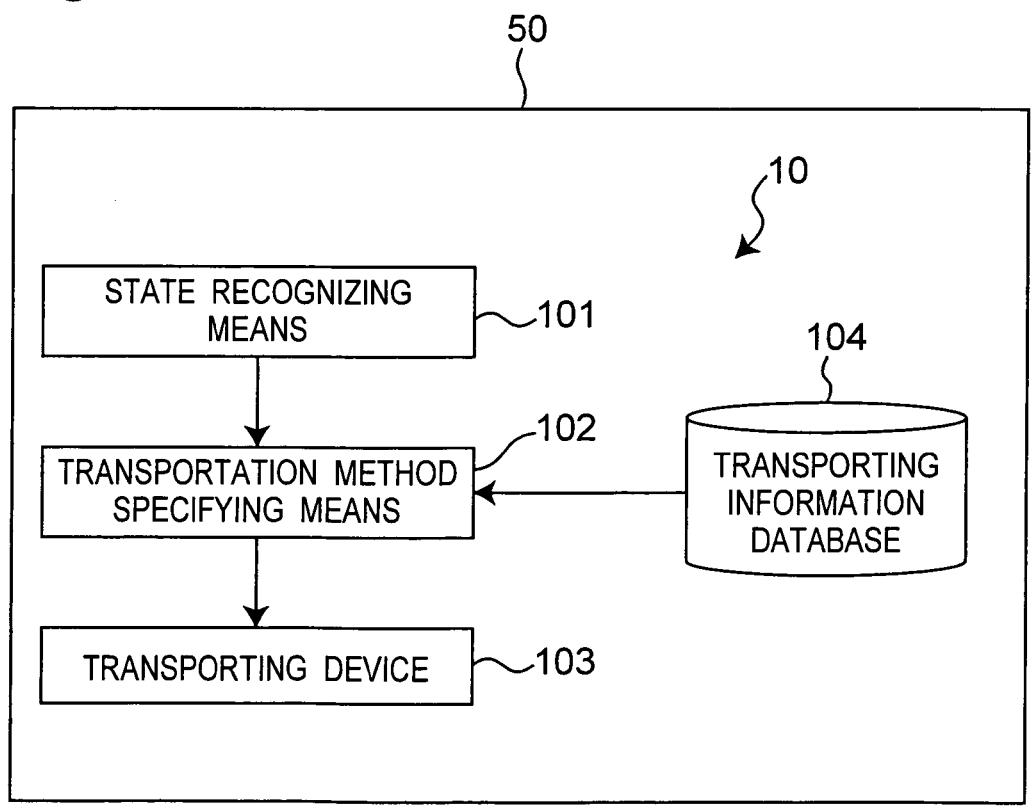
FIG. 1B is a block diagram showing the article transporting robot according to the embodiment of the present invention.
Figure 8:
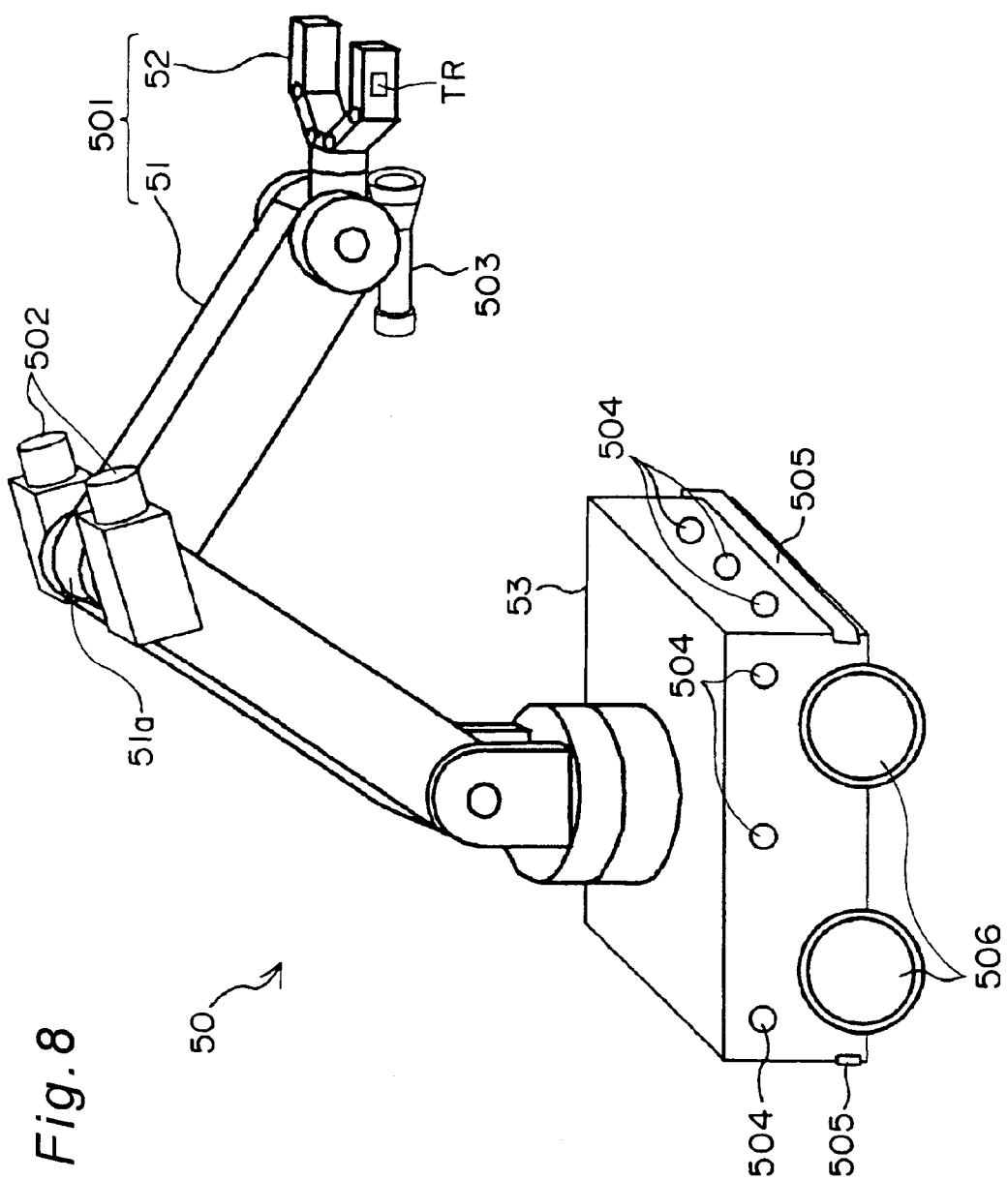
FIG. 8 is a schematic view showing an example of the robot of the article transporting system or the article transporting robot according to the embodiment of the present invention.

The article transporting robot or the article transporting robot of the article transporting system 10 is configured by one robot 50, as shown in FIG. 8, mounted with all of the state recognizing means 101, the transportation method specifying means 102, the transporting device 103, and the transporting information database 104, as shown in FIG. 1B. The state recognizing means 101, the transporting device 103, and the transporting information database 104 are connected to the transportation method specifying means 102.

When these constituent elements are mounted on one device (e.g., robot), it is referred to as an "article transporting robot" 10, and when a part of the above constituent elements is arranged outside the robot 50 including the transporting device 103, it is referred to as the "article transporting system".

The transporting information database 104 is a database that stores in advance the knowledge (information) for specifying the most suitable transportation method from a plurality of transportation methods according to the state of the article when transporting the article in the living space.

The state recognizing means 101 serves as one example of a condition recognizing means and performs recognition of the article to be transported, and the recognition of the state of the relevant article as one example of a condition thereof. As described later, the state recognizing means 101 is configured by various sensors 101*a* such as a camera (e.g., camera 502), a temperature sensor, a weight sensor (e.g., weight sensors 101*b*, 101*b*-1 to 101*b*-9), a tag reader (e.g., tag readers 101*c*, TR, TRw, TR1 to TR9, TR11 to TR17, TR91, TR92 etc.) or is configured by the various sensors 101*a*, a processing part for processing the data detected by various sensors 101*a*, such as a recognition processing part 101*p* or inference processing part 101*g*, and a database 101*d* for storing data necessary when processing (recognition process or inference process) the detected data (refer to FIG. 2F).

The transportation method specifying means 102 specifies one transportation method most suitable when transporting the relevant article from a plurality of transportation methods of the relevant article stored in advance in the transporting information database 104 according to the article or the state thereof recognized by the state recognizing means 101. That is, the transportation method specifying means 102 specifies one transportation method out of a plurality of transportation methods according to the states of the article by referencing the transporting information database 104 when the ID of the article in the living space is the same but the transportation method changes depending on the state of the article and thus a plurality of transportation methods exist. Further, the transportation method specifying means 102 transmits the specified transportation method to the transporting device 103.

The transporting device 103 executes the transportation of the article to be transported according to the information of the transportation method specified by the transporting specifying means 102.

Figure 1C:
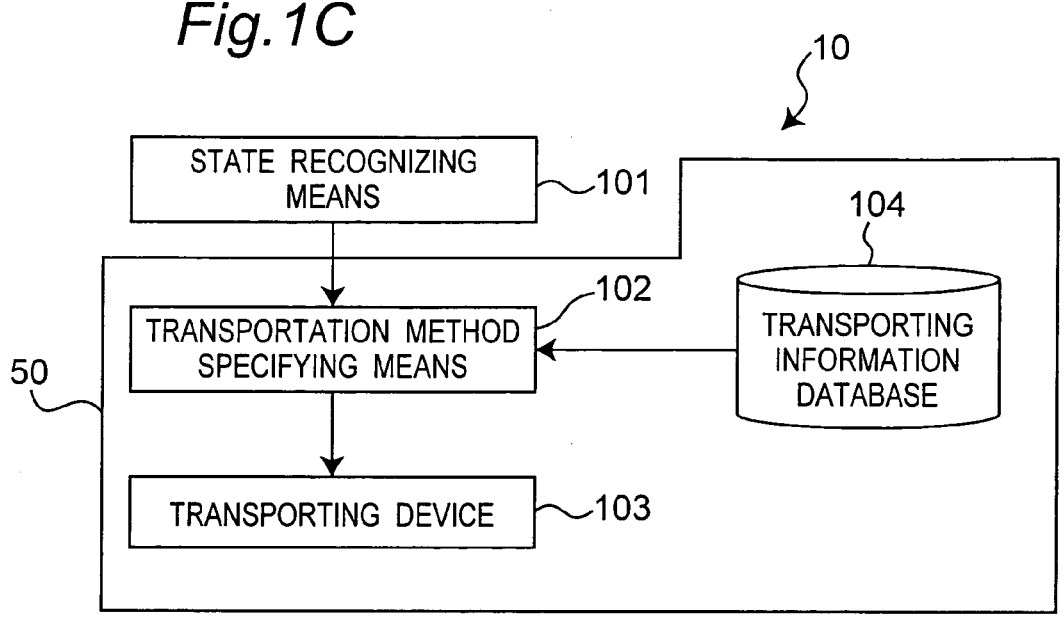
FIG. 1C is a block diagram showing the article transporting system according to the embodiment of the present invention.
Figure 2A:
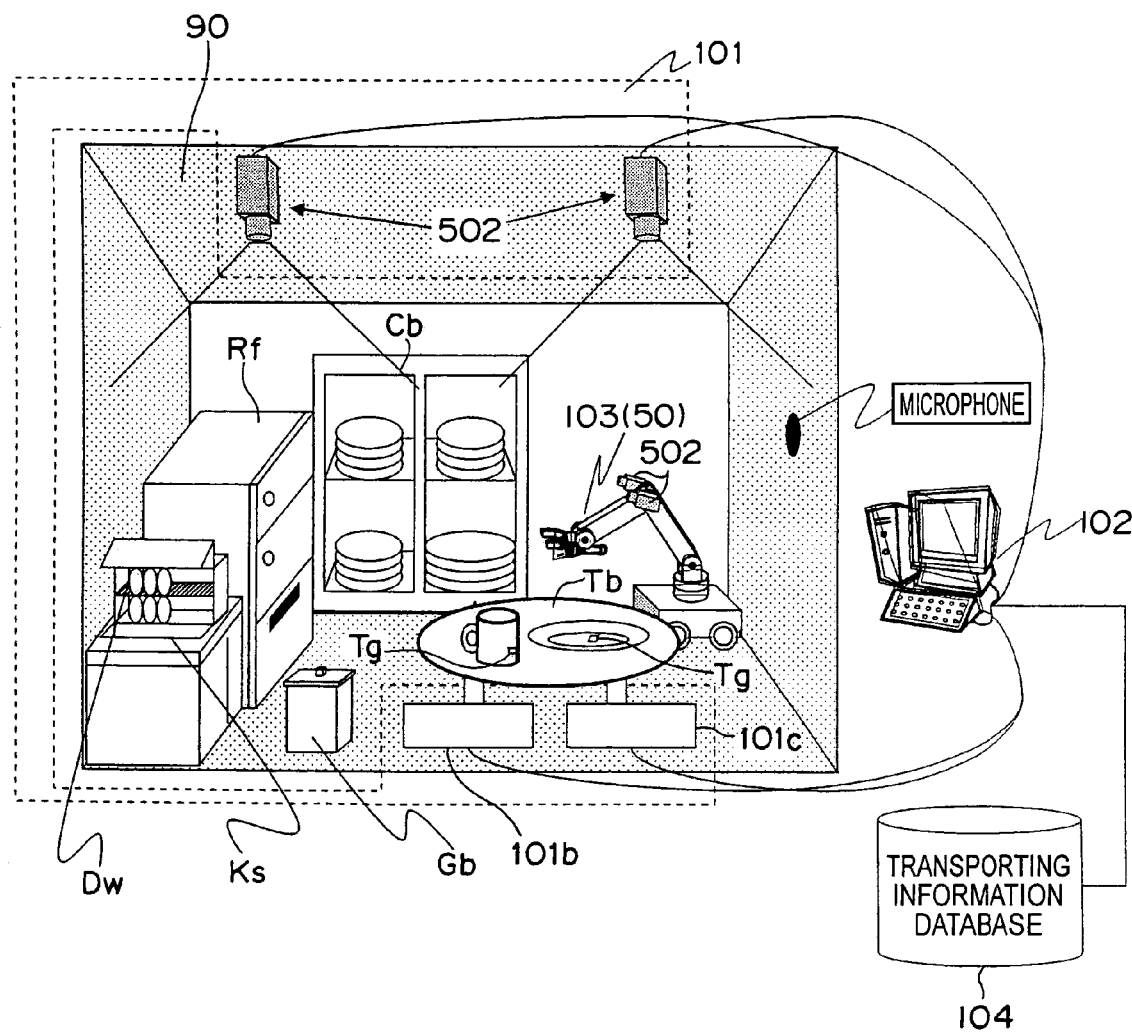
FIG. 2A is an explanatory view showing a configuration example of another further article transporting system according to the embodiment of the present invention.
Figure 2B:
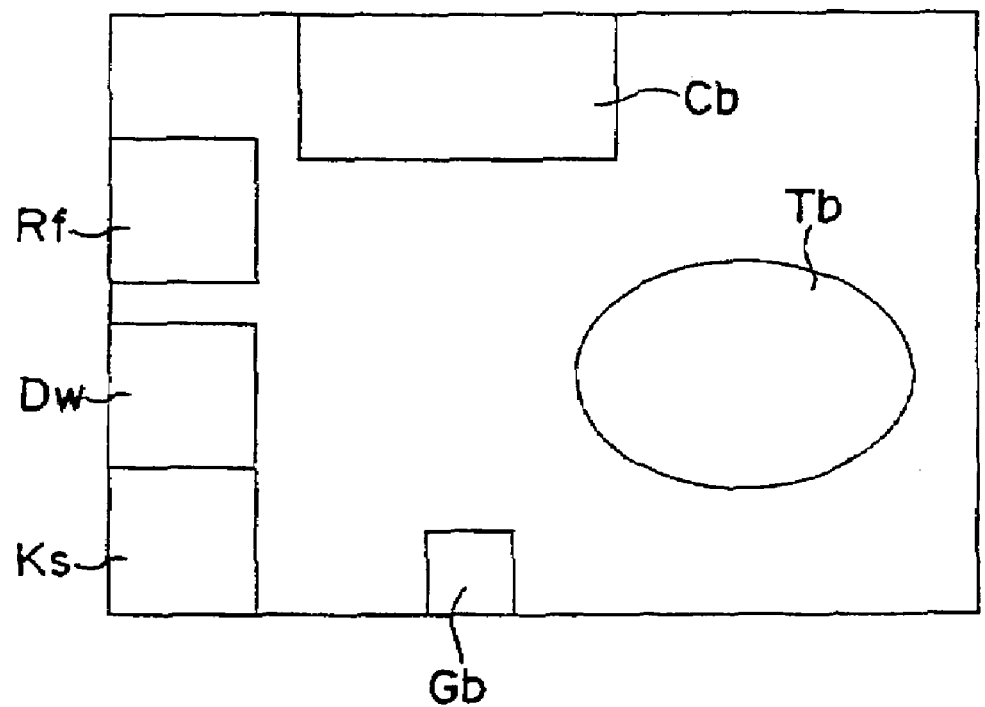
FIG. 2B is a floor plan of a room serving as one example of a living environment where the article is transported by the robot of the article transporting system or the article transporting robot according to the embodiment of the present invention.

Further, as one example of the article transporting robot or the article transporting system of the article transporting system 10, the state recognizing means 101 may be arranged (e.g., camera 502 serving as one example of the state recognizing means 101 is arranged at the ceiling as shown in FIG. 2A) in the living space where the robot 50 other than the robot 50 of FIG. 8 performs the transporting work, and the transportation method specifying means 102, the transporting device 103, and the transporting information database 104 may be mounted on the robot 50, as shown in FIG. 1C.

Figure 1D:
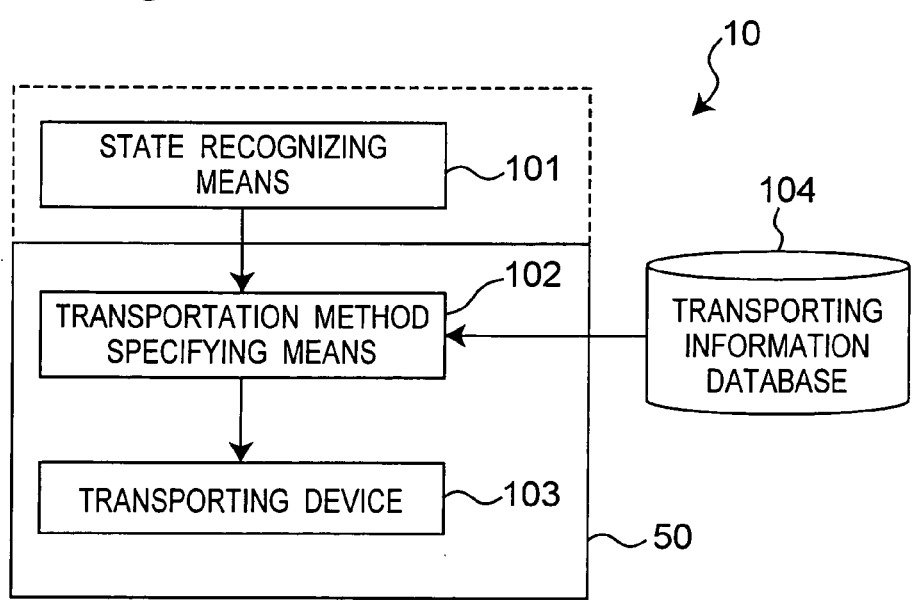
FIG. 1D is a block diagram showing another article transporting system according to the embodiment of the present invention.

As another example of the article transporting system, the transporting information database 104 may be built in the computer (e.g., domestic information server etc.), the state recognizing means 101 may be arranged on the robot 50 of FIG. 8 or may be arranged in the living space where the robot 50 other than the robot 50 of FIG. 8 performs the transporting work (e.g., camera 502 serving as one example of the state recognizing means 101 is arranged at the ceiling as shown in FIG. 2A), and the transporting device 103 and the transportation method specifying means 102 may be mounted on the robot 50, which transportation method specifying means 102 may access the transporting information database 104 built in the computer by way of wireless and/or wired network as necessary, as shown in FIG. 1D.

Figure 2C:
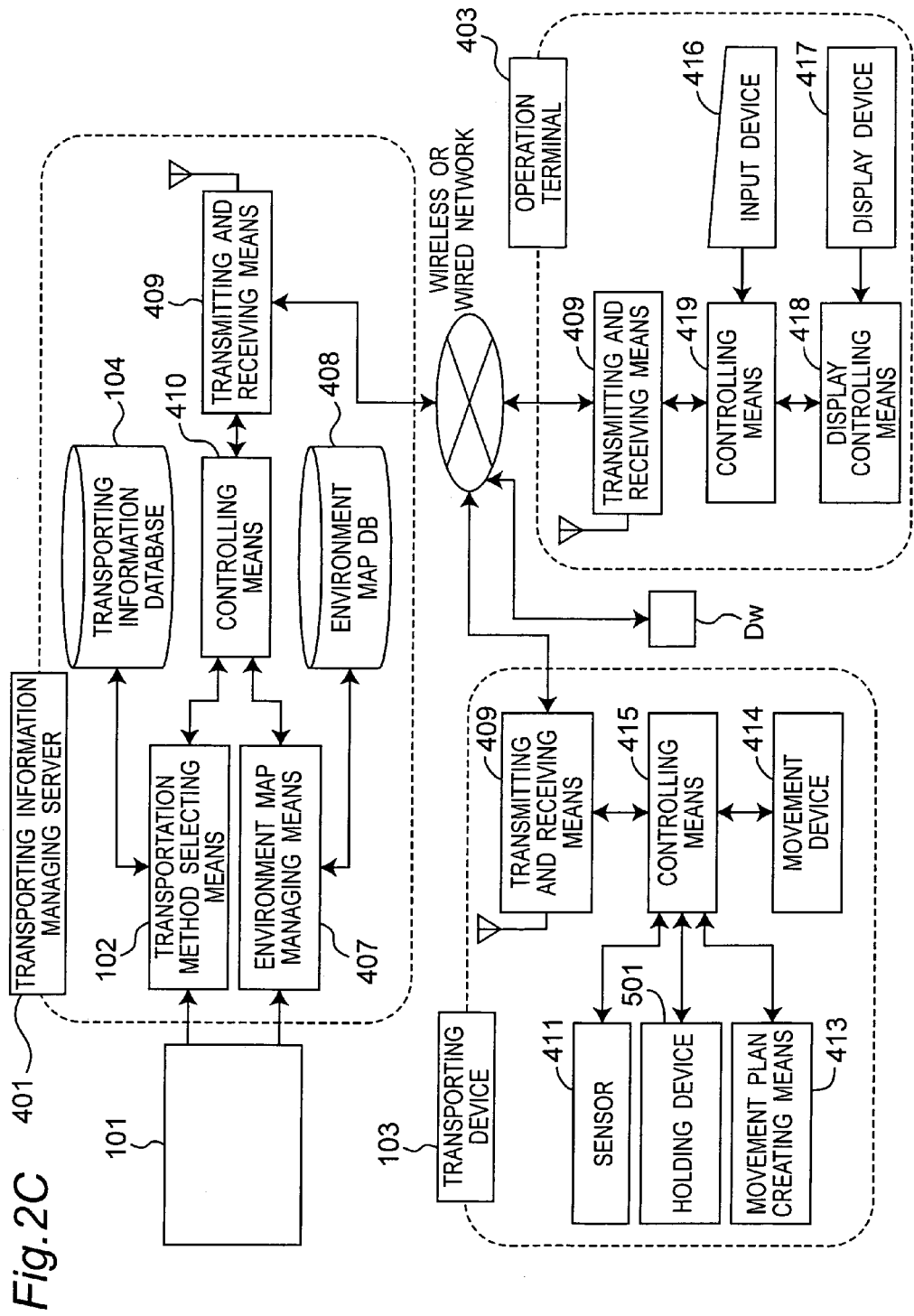
FIG. 2C is a block diagram showing the article transporting system of FIG. 2A.

As another further example of the article transporting system, the state recognizing means 101, the transportation method specifying means 102, the transporting device 103, and the transporting information database 104 may be independently provided, and may be all connected to each other by way of wired or wireless network, for example, as shown in FIG. 2A. More specifically, as shown in FIG. 2C, the transporting information database 104 and the transportation method specifying means 102 may be built in the computer (e.g., transporting information managing server 401) and only the transporting device 103 may be mounted on the robot 50, wherein the transportation method specifying means 102 may access the transporting information database 104 built in the computer as necessary, and may output the transporting information to the transporting device 103 of the robot 50 via the wireless and/or wired network. In the article transporting system shown in FIG. 2A, the robot 50 itself becomes the transporting device 103 itself. Further, the transportation method specifying means 102 may also be referred to as a transportation instructing device that specifies the transportation method when receiving the recognized result from the state recognizing means 101, and outputs the transporting instructions to the transporting device 103 (e.g., robot 50) based on the specified method.

In FIG. 2C showing the block diagram of the article transporting system shown in FIG. 2A, the article transporting system is broadly configured by three sub-systems of the robot 50 serving as the transporting device 103, an environment managing sever 401 serving as a server including the state recognizing means 101 for getting at the state in the living space (environment), and an operation terminal 403 serving as an operation device.

The sub-systems 401 to 403 each includes a transmitting and receiving means 409. The transmitting and receiving means 409 allow information, data, signal, or the like to be independently exchanged with each other by way of the wireless or the wired network based on the control of the respective controlling means. Each transmitting and receiving means 409 is denoted with the same reference number 409 in FIG. 2C since they perform a common process.

In the explanation herein, the term "environment" is the room of a house, by way of an example, but the present invention is not limited thereto, and refers to a living space or a space where the articles are arranged.

The configuration and the operation of each sub-system will now be explained.

<Configuration Of Environment Managing Server>

The environment managing server 401 includes the transportation method specifying means 102 for specifying the article present in the environment of the state acquired by the state recognizing means 101 and the transportation method of the robot 50; the transporting information database 104 for storing in advance the knowledge (information) for specifying the most suitable transportation method out of a plurality of transportation methods corresponding to the state of the article when transporting the article in the living space; an environment map managing means 407 for managing the state of the living space (environment) where the transporting operation is performed, that is, the state of the entire environment such as article, moving body including humans and robots 50, and equipment other than the moving body; and an environment map database 408 for storing the data of the state of the entire environment. The state recognizing means 101 is connected to the transportation method specifying means 102 and the environment map managing means 407 so that the output signal from state recognizing means 101 is input into the transportation method specifying means 102 and the environment map managing means 407. The transportation method specifying means 102 is connected to the transporting information database 104 and a controlling means 410. The environment map managing means 407 is connected to the environment map database 408 and the controlling means 410. The transmitting and receiving means 409 is connected to the controlling means 410.

The transmitting and receiving means 409 receives an inquiry (signal) of the data of the transporting information database 104 or the data of the environment map database 408, or request (signal) for the transporting operation from the outside, sends the response signal thereof to the outside, and transmits a control command of the transporting operation and the like for the robot 50 based on the control of the controlling means 410. The controlling means 410 controls the respective operations of the transportation method specifying means 102, the environment map managing means 407, and the transmitting and receiving means 409 independently.

The state recognizing means 101, in addition to performing the recognition of the article to be transported and the recognition of the state of the relevant article, can constantly monitor the positions (position coordinates) and the states (sit, go out, stand, sleep, walk, hold, suck, grip, release, etc.) of equipments such as furniture, and articles present in the environment and humans and robot 50 present in the environment, to be hereinafter described in detail.

Further, the state recognizing means 101 may detect that the article has been brought into the environment or that the article has been brought out from the environment by human or robot 50. Specifically, the state recognizing means 101 includes the camera (image sensor) 502, tag reader TR, and the like arranged in the environment, which detailed explanation thereof will be hereinafter described. When detecting the article and the like, the state recognizing means 101 transmits the detected information to the transportation method specifying means 102 and the environment map managing means 407. The information transmitted from the state recognizing means 101 to the transportation method specifying means 102 and the environment map managing means 407 includes, for example, the detected time of the article, the position (position coordinate) and the orientation of the article, and the like.

The transportation method specifying means 102 stores and manages information of the article and the like detected by the state recognizing means 101 in the transporting information database 104. The information managed in the transporting information database 104 at least includes ID information and the information of the current position (position coordinate) of the article. The details of the transporting information database 104 will be hereinafter described in detail.

The transportation method specifying means 102 specifies one transportation method by referencing the transporting information database 104 based on the information from the state recognizing means 101. Further, when request for the transporting operation of the article is made from the controlling means 410 to the transportation method specifying means 102 as a result of reception in the transmitting and receiving means 409, the transportation method specifying means 102 picks out the necessary information from the transporting information database 104 according to the content of the request for transporting operation of the article and sends it to the controlling means 410. The details of the transportation method specifying means 102 will be hereinafter described in detail.

The environment map managing means 407 creates the environment map based on the information from the state recognizing means 101 and stores the same into the environment map database 408, and manages the created environment map in the environment map database 408. The environment map stored in the environment map database 408 is used when the robot 50 moves in the living space (environment) to perform the transporting operation of the article, where the robot 50 can acquire the environment map from the server 401 and can plan a movement route plan of the robot 50 for the transporting operation of the article.

When inquiry related to the environment map database 408, request for the transporting operation of the article, and the like are made from the controlling means 410 to the environment map managing means 407 as a result of reception and the like at the transmitting and receiving means 409, the environment map managing means 407 picks out the necessary information from the environment map database 408 according to the content of the inquiry or the request for transporting operation of the article and sends it to the controlling means 410.

The controlling means 410 is an element for controlling the entire environment managing server 401, and mainly includes the following controlling contents.

1) When the transmitting and receiving means 409 receives the inquiry related to various data in the environment managing server 401, and the request for transporting operation of the article and the like, the content of the inquiry and the request for transporting operation of the article and the like is determined at the controlling means 410, and the reference request of the data is output from the controlling means 410 to the transportation method specifying means 102 and the environment map managing means 407 based on the determined result.

2) The result sent from the article-and-moving body search managing means 405 or the environment map managing means 407 to the controlling means 410 with respect to the request is sent to the inquiry originating section or the request originating section for transporting operation of the article via the transmitting and receiving means 409 under the control of the controlling means 410.

3) The work content message related to the request for transporting operation of the article and the like of the robot 50 transmitted from the operation terminal 403 to the controlling means 410 by way of the transmitting and receiving means 409 is interpreted, the robot control command string for the robot 50 to execute the operation is generated in the controlling means 410 and transmitted from the controlling means 410 to the robot 50 via the transmitting and receiving means 409. The robot control command string will be hereinafter described.

4) The states of some of or all of the articles managed at the transporting information database 104, and the state of the environment map managed at the environment map database 408 are broadcasted to the robot 50 and the user (operation terminal 403) by the controlling means 410 via the transmitting and receiving means 409 at every constant time as necessary.

(Environment Map and Equipment Database)

Figure 2D:
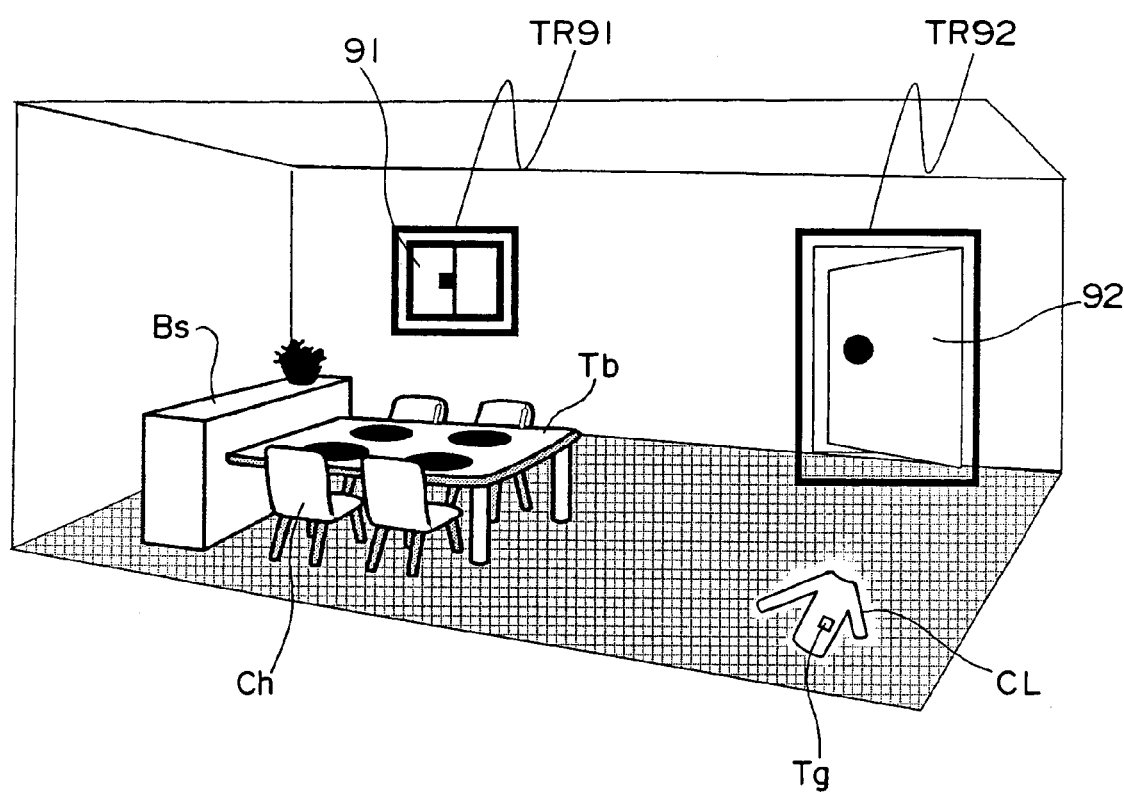
FIG. 2D is a perspective view of a room (room with a bookshelf Bs, a table Tb, and a chair Ch) serving as another example of the living environment in which the article is transported by the robot of the article transporting system or the article transporting robot according to the embodiment of the present invention.
Figure 2E:
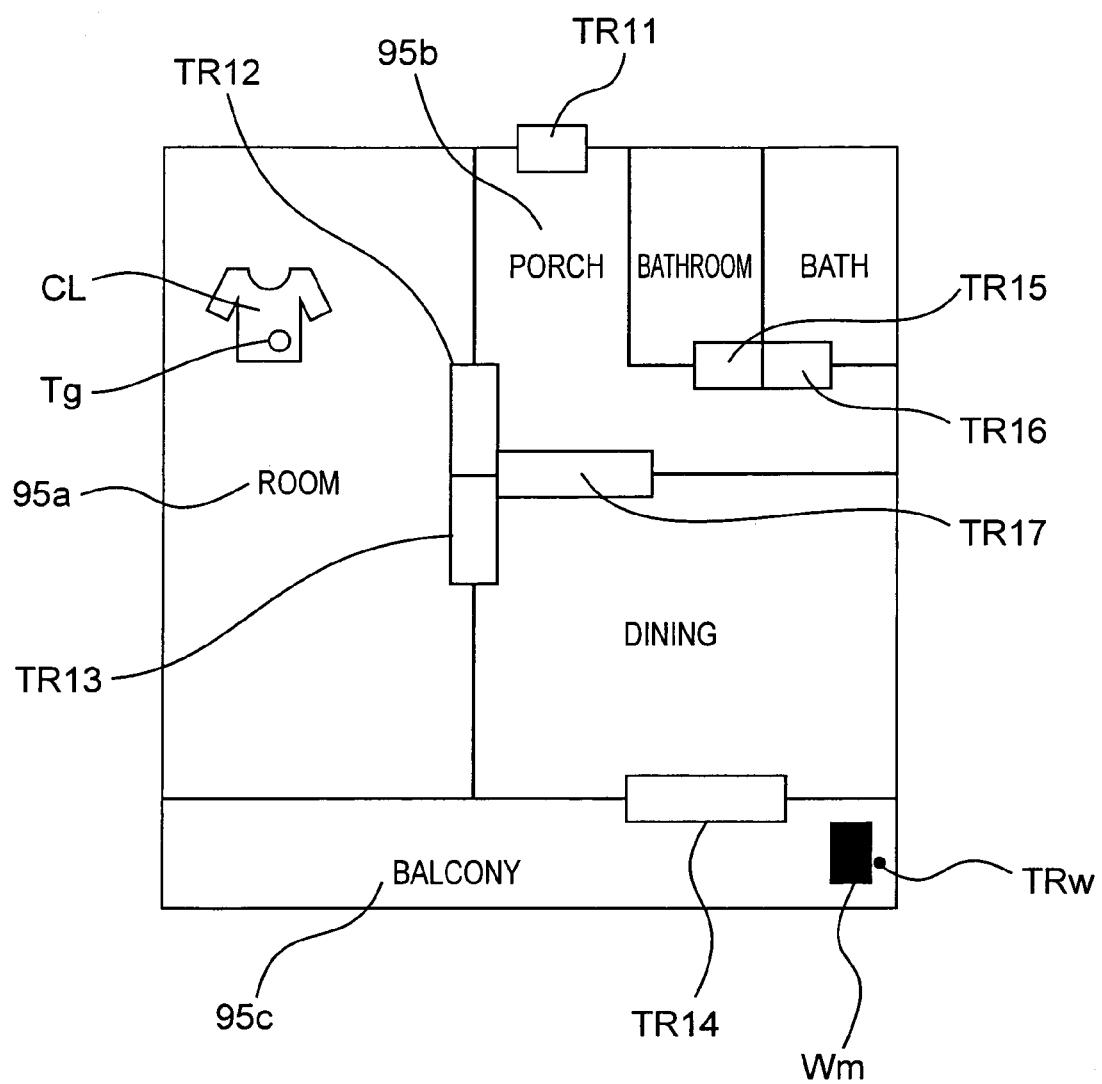
FIG. 2E is a floor plan of a room serving as further another example of the living environment where the article is transported by the robot of the article transporting system or the article transporting robot according to the embodiment of the present invention.
Figure 2F:
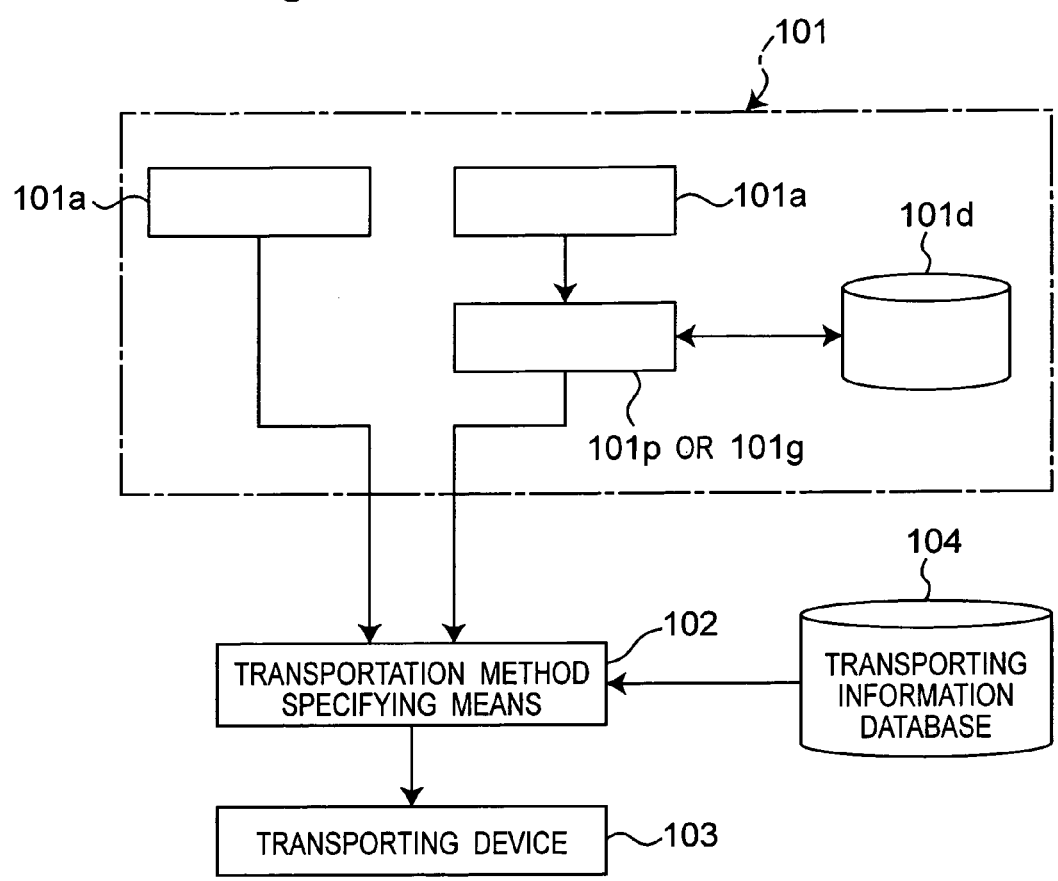
FIG. 2F is a block diagram showing the article transporting robot or the article transporting system showing a state recognizing means in detail.
Figure 2G:
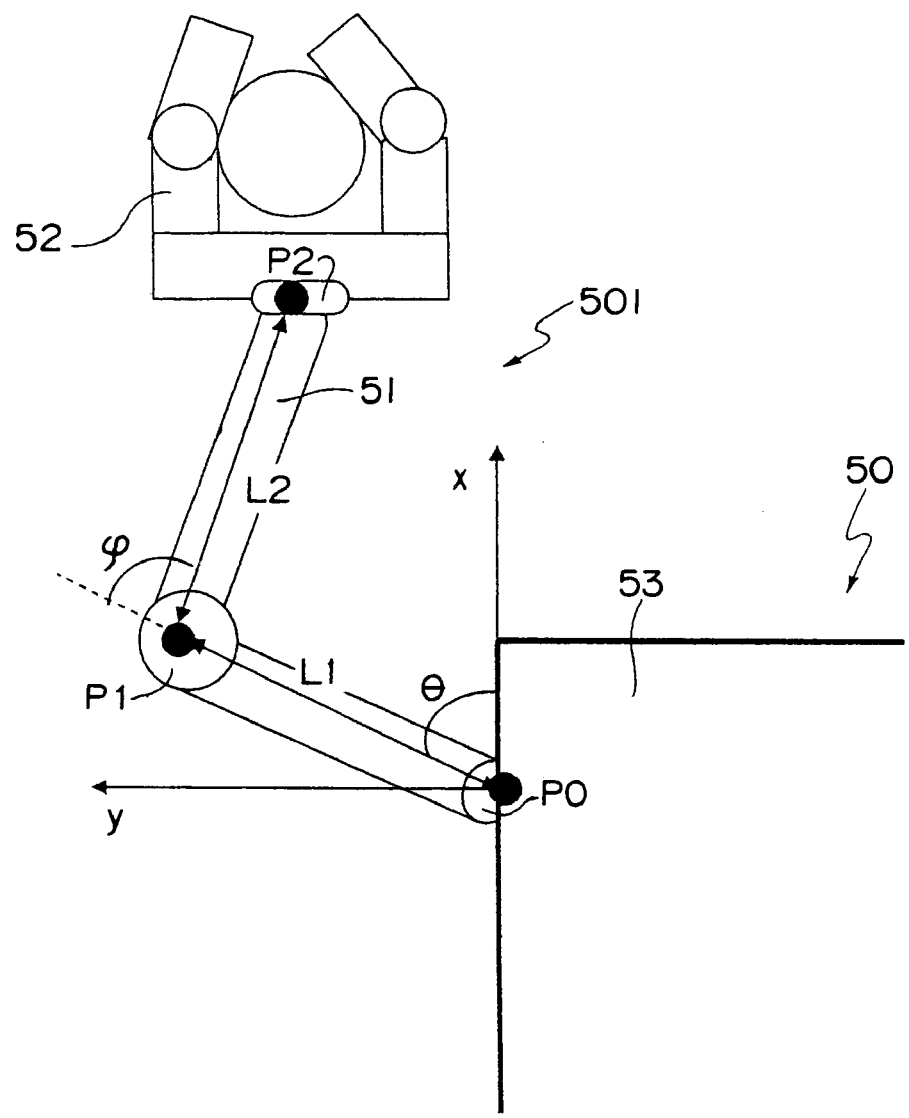
FIG. 2G is a schematic view of a holding device for performing orientation control of the holding device of the robot.
Figure 2H:
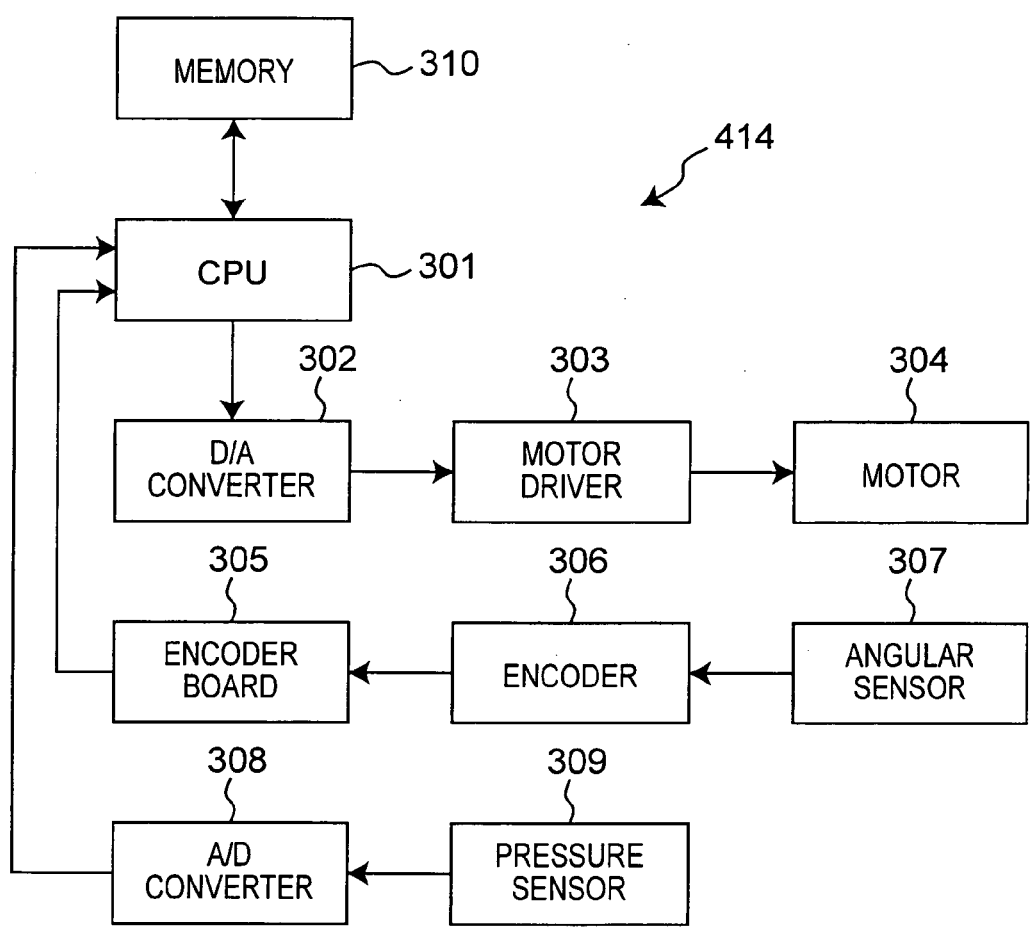
FIG. 2H is a block diagram showing a drive control system of an arbitrary driving part such as an actuator of motor control type of the movement device or the holding device.
Figure 2:
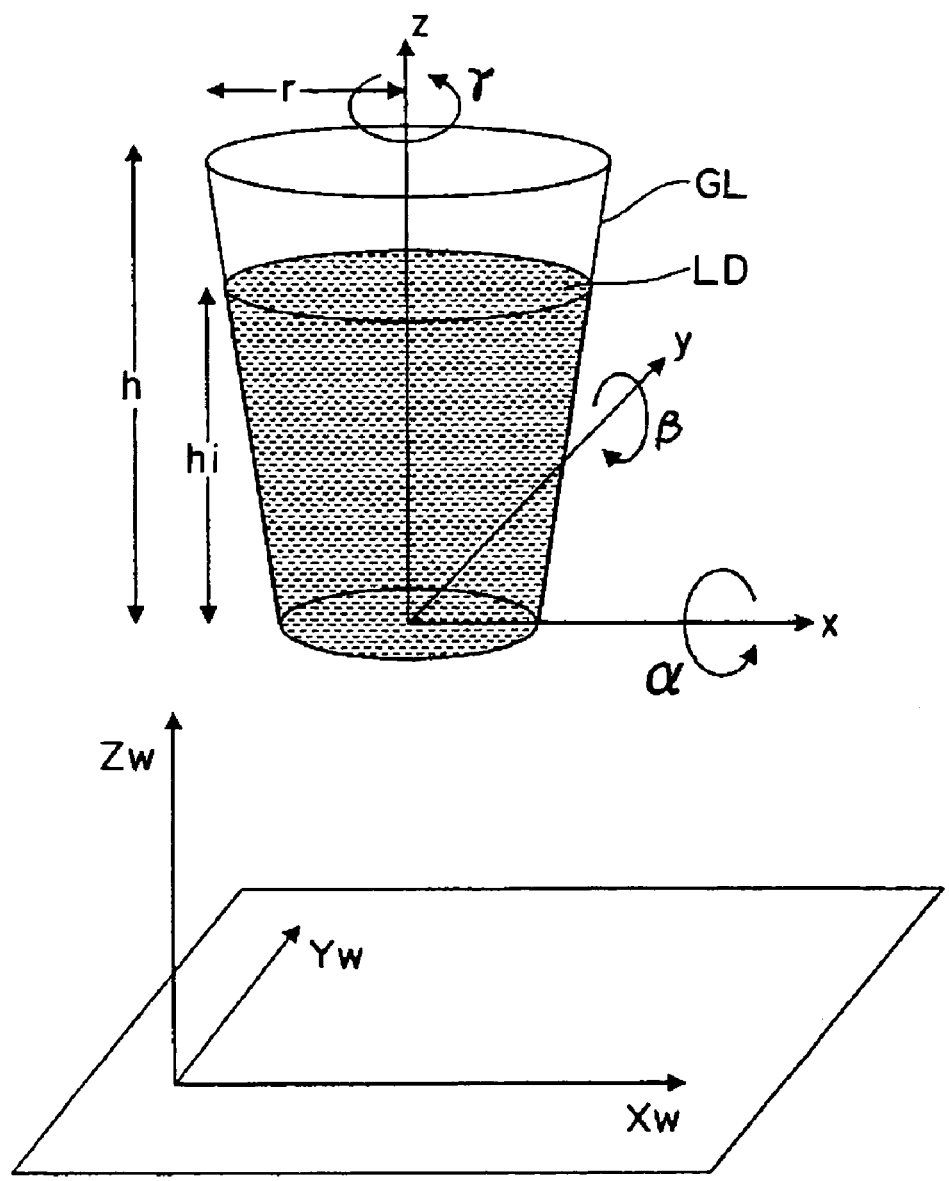
FIG. 2I is an explanatory view of a coordinate system set when controlling the orientation.
FIG. 2J is an explanatory view of an example of an actual environment of an environment map of an environment map database.
FIG. 2K is an explanatory view of an environment map simplifying the actual environment of FIG. 2J of the environment map of the environment map database with a three dimensional model.
FIG. 2L is an explanatory view of an environment map simplifying the actual environment of FIG. 2J of the environment map of the environment map database with a planar model.
FIG. 2M is a view showing one example of a table stored in an equipment database attached to the environment map.
Figure 2J:
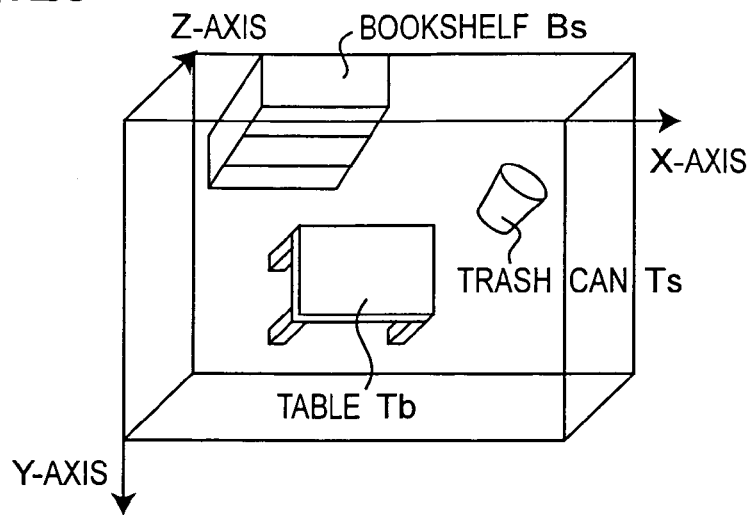
Figure 2K:
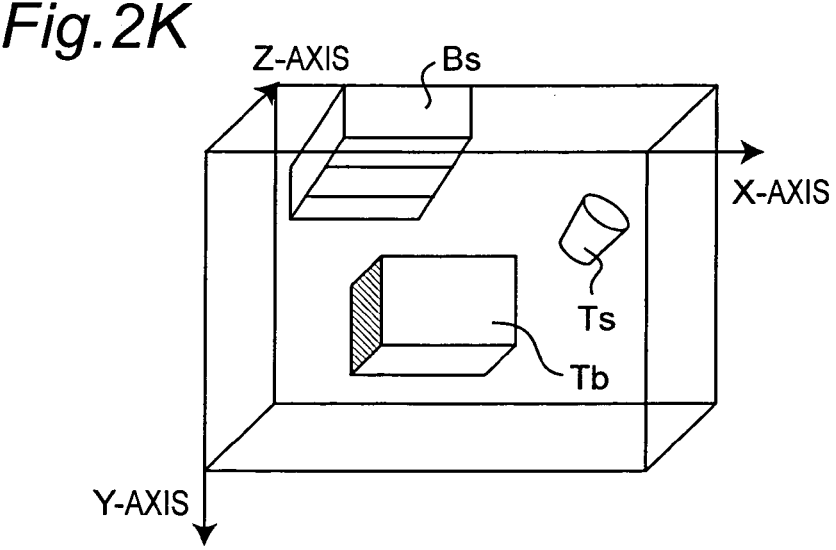
Figure 2L:
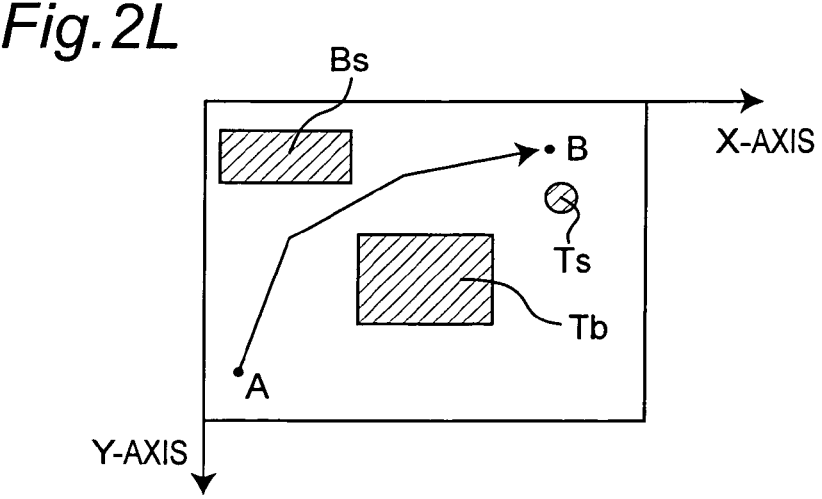

FIG. 2J to FIG. 2L are examples of the environment map of the environment map database 408. FIG. 2J is an example of the actual environment, FIG. 2K is an environment map simplifying the actual environment of FIG. 2J with a three-dimensional model, and FIG. 2L is an environment map further simplifying the actual environment with a planar model.

The environment map may be created according to the application and time (trouble) necessary for creating. For instance, if the environment map needs to be created in an extremely short period of time, the three-dimensional object present in the environment is modeled by a smallest rectangular parallelepiped covering the same, as shown in FIG. 2K. In FIG. 2K, the table Tb and the bookshelf Bs are each modeled with a cuboid, and the trash can Ts is modeled with a substantially column shape. This is also the same for the environment map using the planar model, where in FIG. 2L, the table Tb and the bookshelf Bs are each modeled with a rectangular region (shaded region) orthogonally projected to the plane, and the trash can Ts is modeled with a circular region (shaded region). The two rectangular regions and the circular region are set as regions where the robot 50 cannot move. Further, that in which the actual environment is three-dimensionally modeled, as shown in FIG. 2J, may be the environment map.

Figure 2M:
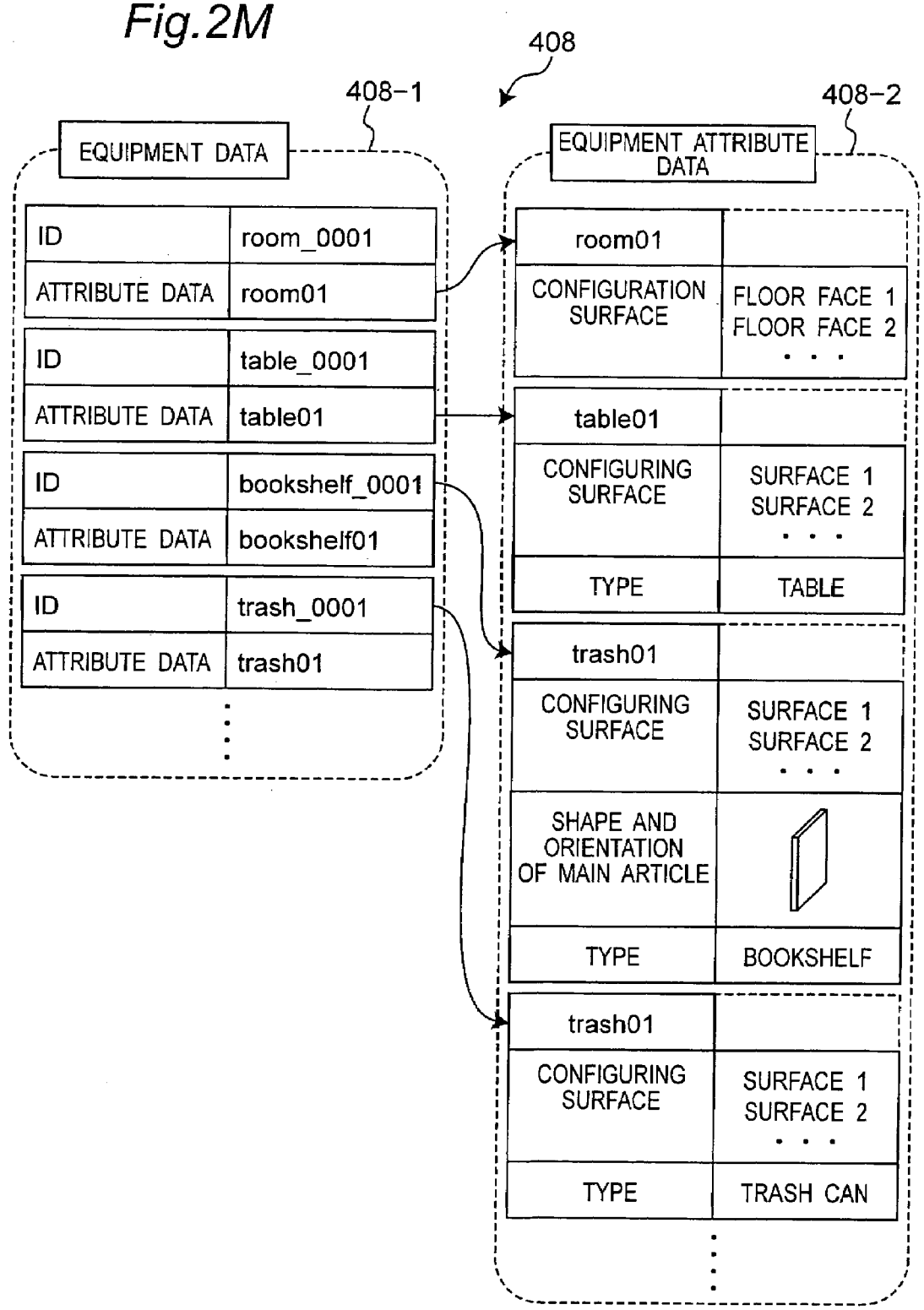

FIG. 2M is a view showing one example of the equipment database 408e attached to the environment map, and corresponds to the above environment. The equipment database 408e is constructed by two sub-databases 408e-1 and 408e-2 each storing the equipment data and the equipment attribute data.

1) Equipment data

The equipment data stored in the sub-database 408e-1 of the equipment data includes ID information (e.g., in FIG. 2M, "room_0001" etc. as ID) for specifying the environment itself and the individual equipment (contrary to the article, fixed or installed in the environment and not target of work of transporting operation of the robot 50) in the environment; and a pointer (e.g., in FIG. 2M, "room01" etc. as attribute data) for the equipment attribute data. More specifically, in FIG. 2M, "room_0001" is added to the environment (room) as the ID information, and "table_0001", "bookshelf_0001", "trash_0001" respectively denote the ID information to the table Tb, the bookshelf Bs, and the trash can Ts present in the environment.

2) Equipment attribute data

In the equipment attribute data stored in the sub-database 408e-2 of the equipment attribute data, the equipment attribute data related to the environment itself includes the floor face data of the relevant environment. For instance, when a plurality of floor faces having a different height with respect to each other exist in the environment, the same number of floor face data (e.g., in FIG. 2M, "floor data 1, floor data 2" etc. as configuring surface of the room_01) as the floor face is stored. The floor face data is represented in the following manner, for example:

((X1, Y1, Z1), (X2, Y2, Z2) (X3, Y3, Z3) (X4, Y4, Z4), 2200, 0).

Here, the first four pairs of coordinate values represent the actual world coordinate of each vertex configuring the floor face, and the value (2200) represents the distance (mm) from the floor face to the ceiling. Further, the final value (0) represents the material of the floor. For example, "0" is wood, "1" is tatami mat, and "2" is carpet etc.

The equipment attribute data related to the equipment such as furniture and the like includes data (surface 1, surface 2) of each surface configuring the equipment, the type of equipment, and the shape and the orientation of the main article to be placed on a surface when the equipment includes the surface where the article can be placed. Specifically, the data of the surface configuring the equipment is expressed in the following manner.

((X1, Y1, Z1), (X2, Y2, Z2) (X3, Y3, Z3), 1, 400)

Here, the first three pairs of coordinate values represent the actual world coordinate of each vertex configuring the surface. The value (1) is a flag of whether or not the article can be placed on the surface after transportation, where "1" means that the article can be placed after transportation, and "0" means that the article cannot be placed after transportation. The final value (400) indicates the upper limit height (mm) of the article that can be placed when the article is placed on the surface after transportation. For instance, when the relevant surface is a top plate of the table, the distance from the top plate to the ceiling becomes the upper limit height, and when the relevant surface is a certain shelf surface in the bookshelf, the distance from the certain shelf surface to the shelf immediately above becomes the upper limit height.

The "shape of the main article" in the equipment attribute data is the shape of the article to be accommodated in the equipment. If the type of equipment is a bookshelf, it becomes "shape of the book". That is, the rectangular parallelepiped in which the length and the height are extremely long compared to the width becomes the shape of the main article. Further, the "orientation of the main article" is the orientation of the article of when accommodated in the equipment. If the type of equipment is a bookshelf, it refers to which orientation the book should be placed on the shelf surface of the bookshelf after being transported, and normally, the book is placed on the shelf surface of the bookshelf at a laid state after being transported in a laid state, but may be placed on the shelf surface of the bookshelf after being changed to a standing orientation, as necessary. By storing the data of "shape and orientation of main article" to the equipment attribute data, for example, when specifying the work of transporting the book to the bookshelf to the robot 50, the robot 50 may transport and place the specified book in the shelf of the bookshelf in a standing orientation based on the "shape and orientation of main article" data.

However, depending on the type of the equipment, the "shape and orientation of main article" data sometimes may not exist. For instance, the table and the trash can have no limit in the shape and the orientation of the article. Thus, the equipment attribute data of the table and the trash can do not include the data of "shape and orientation of main article".

<Configuration Of robot>

The robot 50 performs the work of transporting the article in the environment according to the instructions from the user.

As shown in FIG. 2C and FIG. 8, the robot 50 includes at least: a holding device 501 that grabs the article; a camera 502, a recognition processing part 101p, and a light source 503 that are utilized for recognizing the article to be transported; an obstacle sensor 411 (device that can function as another example of the state recognizing means 101 of the article transporting system 10) for detecting obstacles and the like in the surroundings of the robot 50; a movement plan creating means 413 for planning the movement plan involved in the transportation operation of the robot 50 with reference to the environment map in the environment map database 408 of the environment managing server 401 by way of the transmitting and receiving means 409 and the controlling means 415 that are provided for the robot 50, as well as the transmitting and receiving means 409, the controlling means 410, the transportation method specifying means 102, and the environment map managing means 407 etc. that are provided for the environment managing server 401; and a movement device 414 for moving the robot 50 itself. The transmitting and receiving means 409 performs transmission and reception of various data between the environment managing server 401 and the operation terminal 403 based on the control of the controlling means 415. The controlling means 415 is connected to the obstacle sensor 411, the transmitting and receiving means 409, the article transporting system 10, the movement plan creating means 413, and the movement device 414, and independently controls each operation.

FIG. 8 is a conceptual diagram showing a configuration example of the robot 50 having the article transporting function, wherein the robot 50 includes a main body 53 of a substantially box shape that accommodates the movement plan creating means 413, the controlling means 415, and the like as described above. Hereinbelow, the right side of the paper is called as the front side, the left side of the paper is called as the back side, the near side of the paper is called as the left side, and the far side of the paper is called as the right side in FIG. 8.

The holding device 501 of the robot 50 is configured by multi-joint arm 51, a hand 52 arranged at the distal end of the arm 51, and driving devices for driving the arm 51 and the hand 52 independently, and is attached to the upper part on both sides of the main body 53, as described above. The driving device of each of the arm 51 and the hand 52 may be configured by an actuator of motor control (e.g., at least one motor is arranged at each joint portion, and the arm 51 and the hand 52 may be moved by driving the motor) or may be configured by other actuators of hydraulic type etc., or actuator of artificial muscle and the like. Further, when suction hand for holding the article through suction of air is arranged as the holding device 501, the holding device 501 may be configured by the suction hand and a suction device for controlling the suctioning operation and the suctioning release operation of the suction hand.

Assuming an electronic tag Tg is attached to each article present in the environment, a tag reader Tg etc., serving as one example of the state recognizing means 101 of the environment managing server 401, may be attached to the hand 52 of the holding device 501 (refer to FIG. 8). Thus, when the hand 52 of the holding device 501 holds the article, the tag reader TR of the hand 52 reads the information written in the electronic tag Tg of the article being held, and the type of the article held by the hand 52 of the holding device 501 may be specified by the read information with reference to the transporting information database 104 or the environment map database 408 at the transportation method specifying means 102 of the environment managing server 401. The tag reader TR attached to the hand 52 of the holding device 501 may be omitted and the tag reader TR installed in the environment may be used.

The movement device 414 is configured by four wheels 506, motors 304 for driving the four wheels 506 in a forward and reverse rotating manner, motor drivers 303 for drive controlling the motors 304 (refer to FIG. 2H), and the like, where two wheels 506 are attached to both left and right sides of the main body 53 (in the example of FIG. 8, two wheels 506 on the right side are omitted). The most suitable configuration for the configuration of the movement device 414 may be selected according to the environment where the robot 50 is used. For instance, when strong bumps are present on the floor on where movement is carried out, the movement device 414 is preferably configured into a crawler type or multilegged walking type.

The obstacle sensor 411 is herein configured by ultrasonic sensors 504, a pair of cameras 502 serving as a visual sensor, and a collision sensor 505.

Each ultrasonic sensor 504 emits ultrasonic, calculates the approximate distance to the obstacle by measuring the time from when the ultrasonic is emitted until receiving the reflected wave thereof, and detects the obstacle at short distance before colliding with the robot 50. Three ultrasonic sensors 504 are attached to each side surface (front surface, back surface, and left and right side surfaces) of the main body 53.

Further, each camera 502 inputs the state of the surrounding of the robot 50 as an image. By performing recognition process and the like with respect to the image, presence of the obstacle may be determined, and more accurate information about the article to be transported can be obtained. Further, the camera 502 is also used when recognizing the article to be transported as described above. The camera 502 is attached to the joint part 51a at the middle of the arm 51 attached to the main body 53 in a position changeable manner.

The collision sensor 505 detects that a predetermined impact force has been applied to the robot 50. For instance, collision of the obstacle to the robot 50, or the collision of the robot 50 itself to the obstacle when moving is detected by the collision sensor 505. The collision sensor 505 is attached to the lower part on the front surface and the lower part on the back surface of the main body 53.

FIG. 2G is a schematic view of the holding device 501 for performing orientation control when holding the article. In FIG. 2G, the joint arm 51 of the holding device 501 has the basal end-side arm of length L1 and the distal end-side arm of length L2, the basal end part of the basal end-side arm is rotatably connected to the side of the main body 53 of the robot 2 through a joint P0, and the distal end of the arm on the basal end-side and the basal end of the arm on the distal end-side are connected in a bendable manner by a joint P1 (joint 51a), and further, the hand 52 is connected to the distal end of the arm on the distal end-side by way of the joint P2. The orientation control of the contacting joint P2 of the hand 52 and the arm 51 in a two-dimensional plane will be considered to simplify the explanation.

FIG. 2H shows the drive control system of an arbitrary driving part such as an actuator of motor controlling type of the movement device 414 or the holding device 501. Similar drive control system is configured for all the driving parts.

The motors 304 have the rotating shafts normally and reversely driven by the currents supplied from the motor drivers 303, for example, to forwardly and reversely rotate the four wheels 506. An angular sensor for detecting the rotating angle of the driven rotating shaft is arranged on the motor 304. The output signal from the angular sensor 307 is input to the CPU 301 through the encoder 306 and the encoder board 305.

The CPU 301 controls the drive of the motors 304. A memory 310 for storing information necessary for control is connected to the CPU 301.

A pressure sensor 309 for detecting whether the article to be transported is held in a proper manner is arranged on, for example, the gripping surface and the like at the hand 52, and the output signal from the pressure sensor 309 is input to the CPU 301 via the A/D converter 308.

After receiving the output signal from the angular sensor 307 and the sensor output signal from the pressure sensor 309 as input signals, the CPU 301 generates the control signal for the motor 304 according to the received input signals, which control signal is sent to the motor driver 303 via the D/A converter 302. The motor 304 is forwardly or reversely driven according to the control signal and thus realizes the orientation control of the arm 51 and the hand 52.

Assume the lengths of the arm 51 are L1, L2, and the angles obtained by the angular sensor 307 (encoder herein) at the joints P0, P1 are θ and φ, respectively. The position of the distal end position P2 of the arm 51 is derived from the following relational expression.

$$P2=(L1\cos\theta+L2\cos(\theta-\phi), L1\sin\theta+L2\sin(\theta-\phi)) \quad \text{(Equation 1)}$$

From the above relational expression, the orientation control can be realized since the position of the object to be transported is estimated, and can be moved to an arbitrary position. The orientation control is the accurate control of the position and the direction through fine adjustment based on the information of the above angular sensor and the like. Only the positional control in a two-dimensional plane is explained for the sake of simplicity, but similar processes are also possible for the position and orientation control in the three-dimensional space.

For instance, when holding the glass GL containing liquid inside by the hand 52, the orientation control in the three-dimensional space is to control the orientation so that the liquid does not spill out. The coordinate system is set as in FIG. 2I. That is, with regards to the position of the object, the horizontal floor face configured by the Xw axis and the Yw axis that are orthogonal to each other is set as Xw-Yw plane, and the Zw axis directed upward from the plane is set. With regards to the orientation (rotation), the bottom of the glass GL is set as the x-y place configured by the x axis and the y axis that are orthogonal to each other, the vertical direction directed towards the mouth of the glass GL from the plane is set as z⁻ direction, and the clockwise direction seen from the origin side for each axis of x, y, and z is the direction of α, β, and γ. When performing orientation control of the glass GL containing liquid LD, it is only necessary not to change only the directions of α and β with respect to the six axes.

The movement plan creating means 413 creates the movement route from the position coordinate of the current position of the robot 50 to the position coordinate of the target position with reference to the environment map of the environment map database 408 when transporting operation of the article is requested. The immovable region (shaded region) is set in the environment map, as shown in FIG. 2L. Thus, the movement route avoiding obstacles can be created when the movement route is created at the region other than the immovable region. For instance, in FIG. 2L, when moving from point A to point B, the route that avoids the immovable region is created, as shown with an arrow, taking into account the size of the robot 50. In creating the movement route, the most common Dijkstra method is used, and the route searching algorithm modified from the Dijkstra method may be used if the environment is complicating. As a countermeasure of when the movement route cannot be derived or it requires a long time for deriving since the environment is too complicating, a mode for the user to specify the movement route of the robot 50 to the movement plan creating means 413 using the operation terminal 403 may be provided.

(Control Command of the Robot)

The controlling means 415 of the robot 50 interprets the robot control command string sent mainly from the environment managing server 401 via the transmitting and receiving means 409, 409 of the environment managing server side and the robot side, and executes the control command in order.

The robot control command is a command to perform the control of the movement of the robot 50 itself for holding the article or for transporting operation, and is mainly categorized into three types of "movement", "holding", and "release". The commands of the three types will now be briefly explained.

1) Movement (move, coordinate) or (move, equipment ID)

This is a command for the robot 50 to move from the position coordinate of the current position of the robot 50 to the position specified in position coordinate, or to the position coordinate of the position of the equipment specified by the equipment ID information for the article transporting operation. The position coordinate is specified by the world coordinate system, and the movement route from the position coordinate of the current position to the position coordinate of the target position is planned by the movement plan creating means 413. Further, when moving to the position coordinate of the position of the equipment specified by the equipment ID information, the route that approaches the equipment up to a predetermined distance is created, in which case, the equipment attribute data in the environment map is used.

2) Holding (grab, article ID)

This is a command for holding the article specified by the article ID information by the hand 52 serving as one example of the holding device 501. The position (position coordinate) of the article is derived with reference to the transporting information database 104 or the environment map database 408, and the transporting operation is selected by the transportation method specifying means 102 of the article transporting system 10 with reference to the transporting information database 104.

3) Release

This is a command for releasing the hand 52 after terminating the transportation.

For instance, when a work to move a certain article to a certain place is instructed from the user, such work is broken down into four work units of "move (to the position B1 of article)", "hold (article)", "move (to the destination B2)", and "release (holding of article)". The robot control command string in this case is as follows.

move, B1 (move the robot 50 to the position B1 where the article is placed);

grab, article ID (hold the article at the position B1 with the holding device 501;

move, B2 (move the robot 50 to the position B2 as the destination while holding the article with the holding device 501)

release (release the article held by the holding device 501).

When instructed the movement of a plurality of articles, the command string is lined for the number of articles with four commands as one set, and the controlling means 415 of the robot 50 sequentially executes the control command in the relevant order.

The robot control command is of course not limited to the above three types, and may be increased as necessary.

<Configuration of the Operation Terminal>

The operation terminal 403 is a user interface in the article transporting system by the robot, and is the terminal which the user operates to request etc. the transporting operation of the article to the robot 50.

As shown in FIG. 2C, the operation terminal 403 includes a display device 417 constructed by CRT, liquid crystal display, or the like, for displaying the operation screen, an input device 416 constructed by a pointing device or the like for instructing the article transporting operation to the robot 50 on the operation screen of the display device 417, and a display controlling means 418 for performing display control of creating the operation screen displayed on the display device 417. Under the control of the controlling means 419, the transmitting and receiving means 409 transmits, to the environment managing server 401, the content of request and the content of the inquiry for the transporting operation of the article of the robot 50 input to the input device 416, and receives the response to the request and the inquiry for the transporting operation of the article from the environment managing server 401. The controlling means 419 is connected to the transmitting and receiving means 409, the input device 416, the display device 417, and the display controlling means 418, and controls each operation independently.

A general purpose PC (personal computer) and the like may be used as the operation terminal 403. In this case, the PC may be used as the operation terminal 403 by reading the control program for executing each process into the general purpose PC.

The display controlling means 418 creates the operation screen based on the information transmitted from the environment managing server 401, specifically, the data of the image of the environment taken by the camera 502 serving as one example of the state recognizing means 101, the data stored in the transporting information database 104, and the environment map stored in the environment map database 408. The created operation screen is displayed on the display device 417.

That is, in the above system, the operation terminal 403 displays the image representing the predetermined living space on the display device 417, the user performs the instructions of the transporting operation on the article included in the image through the operation terminal 403, and the transportation method specifying means 102 of environment managing server 401 converts the instructions of the user transmitted from the operation terminal 403 to the control command executable by the robot 50 with reference to the transporting information database 104, and transmits the same to the robot 50. With such article operating method, the user allows the robot, in other words, the life-supporting robot 50 to easily execute the accurate article transporting operation in a complicating state of the living space.

The holding device 501 of the robot 50 can perform the holding and the transporting operation of the article by the article transporting system 10 using the object information such as position (position coordinate), ID information, and shape of the article or the object to be transported, and information of the human such as position (position coordinate) and ID information of the human.

The configuration of the article transporting robot 10 and the article transporting system is not limited thereto, and may be of any configuration as long as the construction realizes the transporting process to be hereinafter described.

The detail of each of the transporting information database 104, the state recognizing means 101, the transportation method specifying means 102, and the transporting device 103 will now be explained.

(Transporting Information Database)

The transporting information database 104 is a database for storing the transporting information in which the state the article may take and the transporting operation (i.e., transportation method) and/or the transporting place are corresponded, for every article in the living space.

FIG. 3A, FIG. 3B, and FIG. 3C each shows one example of the transporting information stored in the transporting information database 104 for every article. The transporting information is the transporting information of when transporting the article for the purpose of clearing away the article. At least two information are included as the transporting information in the transporting information database 104. One is the information related to the transporting operation of the transporting device 103, which information of the transporting operation includes at least two of the orientation information and the transporting speed information of the article when transporting. The other transporting information is the information related to the transporting destination or the transporting place of the article.

FIG. 3A shows one example of the transporting data set for a certain plate serving as one example of the article. The plate may take at least four states of "clean", "dirty", "with food particles", and "with leftovers" when the plate is used in a general household. The plate may take various other states other than the above but explanation will be made on the four states for the sake of easy understanding.

Further, the state of the plate is recognized by the state recognizing means 101, which process will be hereinafter described.

First, when the plate is in "clean" state, no particular attention is necessary when transporting the plate. The orientation and the speed are both set as "free" for the operation information with respect to such state. Here, "free" means that the article is transported at the orientation and speed most suitable for the transporting device 103. Since the "clean" plate is stored as it is, the "cupboard" Cb is set for the transporting place for the "clean" state.

When the plate is in "dirty" state, the operation and the place change from the "clean" state. That is, when the dirty is liquid such as sauce, the sauce and the like must be prevented from dripping off from the plate when transporting the plate. Thus, orientation is set as "upward" and the speed is set as "low speed" for the operation information corresponding to the plate of "dirty" state. Since the dirty plate must be washed, the "sink" Ks is set for the transporting place. Alternatively, the "dishwasher" Dw may be set instead of the "sink" Ks. Here, "low speed" refers to the movement at a speed at which transportation is possible without the sauce and the like dripping off from the plate while transporting the plate, for example, at the speed of slower than or equal to 2 km/h.

When the plate is in "with food particles" state, the food particles on the plate must be prevented from falling off the plate while transporting the plate, similar to the "dirty" state, and thus the orientation is set to "upward" and the speed is set to "low speed" for the operating operation. When food particles are present, the food particles must be thrown away before washing the plate, and thus "raw garbage can" Gb is set for the transporting place. Here, "low speed" refers to the movement at a speed at which transportation is possible without the food particles on the plate falling off while transporting the plate, for example, at the speed of slower than or equal to 2 km/h.

Further, when the plate is in "with leftovers" state, the leftovers on the plate must be prevented from falling off the plate while transporting the plate, and thus the orientation is set to "upward" and the speed is set to "low speed" for the operation information. When the leftover is present, it is desirably transported to a place suitable for storing the leftover article. Thus, "refrigerator" Rg is set for the transporting place. The state of the leftover is further subdivided, and the transporting place may be set for each subdivided state. For instance, the leftover state is divided into food particle portion and the leftover portion, where the "raw garbage can" Gb is set for the transporting place for the food particle portion since the food particle portion must be thrown away, and the "refrigerator" Rg is set for the transporting place for the leftover portion since the leftover portion must be stored. Here, "low speed" refers to the movement at a speed at which transportation is possible without the leftover on the plate falling off while transporting the plate, for example, at the speed of slower than or equal to 2 km/h.

FIG. 3B shows one example of the transporting data set with respect to a cup serving as one example of the article. When the cup is used in a general household, the cup may take at least three states of "clean", "without leftover drink", and "with leftover drink". The cup may take various other states, but the explanation will be made on the three states for the sake of simplicity.

First, when the cup is in "clean" state, no particular attention is necessary when transporting the cup, and thus the orientation and the speed are both set as "free" for the operation information with respect to the state. Further, since the "clean" cup is stored as it is, the "cupboard" Cb is set for the transporting place for the "clean" state.

When the cup is in "without leftover drink" state (state in which there is without leftover drink but may be dirty), the drink attached to the cup must be prevented from dripping while transporting the cup even if there is no leftover drink. Thus, the orientation is set as "upward" for the operation information corresponding to when the cup is in "without leftover drink" state, and the speed is set as "free" since the drink does not spill out if the orientation of the cup is upward. Further, since the cup must be washed as it is dirty even if there is no leftover drink, the "dishwasher" Dw is set for the transporting information. Alternatively, the "sink" Ks may be set instead of the "dishwasher" Dw.

When the cup is in "with leftover drink" state, the drink must be prevented from spilling out while transporting the cup, and thus the orientation is set as "upward" and the speed is set as "low speed" for the operation information. When there is leftover drink, the "sink" Ks is set for the transporting place to discard the leftover drink. The transporting place may be appropriately changed according to the state of the leftover drink, for example, the "refrigerator" Rg may be set for the transporting place suitable for storing the leftover drink. Here, "low speed" refers to the movement at a speed at which transportation is possible without the drink spilling out while transporting the cup, for example, at the speed of slower than or equal to 2 km/h.

FIG. 3C shows one example of the transporting data set for a certain book serving as one example of the article. When the book is used in a general household, the book may take at least two states of "not stacked" where there is only one book, or "stacked" where a book or another article is on the book. The book may take various other states, but the explanation will be made on the two states for the sake of simplicity.

First, when the book is in the "not stacked" state, no particular attention is necessary while transporting the book, and thus the orientation and the speed are both set to as "free" for the operation information with respect to such state. Further, since the book in "not stacked" state is assumed to be cleared away to the normally cleared away place, the "bookshelf" Bs is set for the transporting place with respect to the "not stacked" state.

When the book is in the "stacked" state, another article (e.g., book) is carried on the book, and thus the another article being carried must be prevented from falling during transportation. Thus, the orientation is set as "upward" and the speed as "low speed" for the operation information corresponding to when the book is in the "stacked" state. Further, when transporting a certain book in a state stacked with another article, the book is not cleared away to the "bookshelf", and thus, "user specified destination" is set for the transporting place corresponding to the "stacked" state. This does not mean setting the transporting place in advance, but means that the user specifies the transporting place. Here, "low speed" refers to the movement at a speed at which transportation is possible without an object being carried from falling during transportation, for example, at the speed of slower than or equal to 2 km/h.

The above explanation is the basic configuration of the transporting information stored in the transporting information database 104, but transportation of the article may be optimized or user-friendliness may be further enhanced by configuring the transporting information as described below. Hereinbelow, modification examples of the transforming information will be described.

(Modification Example 1 of the Transporting Information)

FIG. 4A to FIG. 4D show examples of the transporting information according to modification example 1. The transporting information sets the speed change of the transporting speed when transporting the article, thereby further optimizing the transportation.

The transporting information shown in FIG. 4A is the transporting information set for the cup. Compared to the transporting information shown in FIG. 3B, the setting of the transporting speed is changed in the transporting information shown in FIG. 4A. That is, the transporting speed is merely set to "free" or "low speed" in the transporting information shown in FIG. 3B, and the way of controlling the transporting speed of low speed is not set. In the transporting information shown in FIG. 4A, the transporting speed is set to "speed regulation 1", "speed regulation 2", "speed regulation 3", and the like, thereby also setting the changing control of the speed during the transportation of the article.

The "speed regulation" numerically defines how to change the speed in relation to the speed with respect to time from the start to the end of transportation.

Figure 4B:
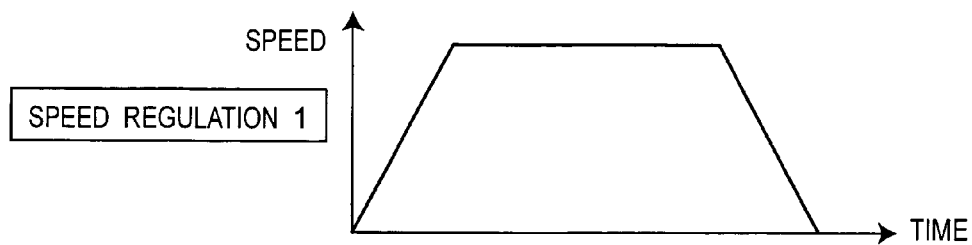
FIG. 4B is a view showing another example of the data (data containing the transporting speed of speed regulation 1) stored in the transporting information database of FIG. 4A.

In the "speed regulation 1", the controlling content is such that acceleration to a predetermined speed occurs at a constant acceleration from the start of transportation, and thereafter the movement is continued maintaining the constant speed, and deceleration at a constant acceleration is carried out before a predetermined time (when approaching the transporting place) from the end of transportation, as shown in FIG. 4B.

Figure 4C:
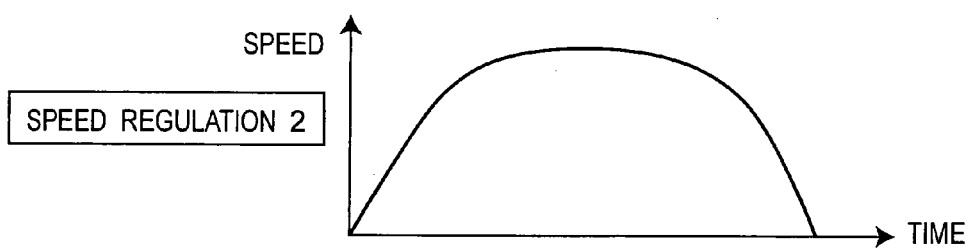
FIG. 4C is a view showing another example of the data (data containing the transporting speed of speed regulation 2) stored in the transporting information database of FIG. 4A.

The "speed regulation 2" has the property of a curve different from the speed regulation 1, as shown in FIG. 4C. By changing the acceleration in a curve form, the load acting on the article being transported can be relieved.

Figure 4D:
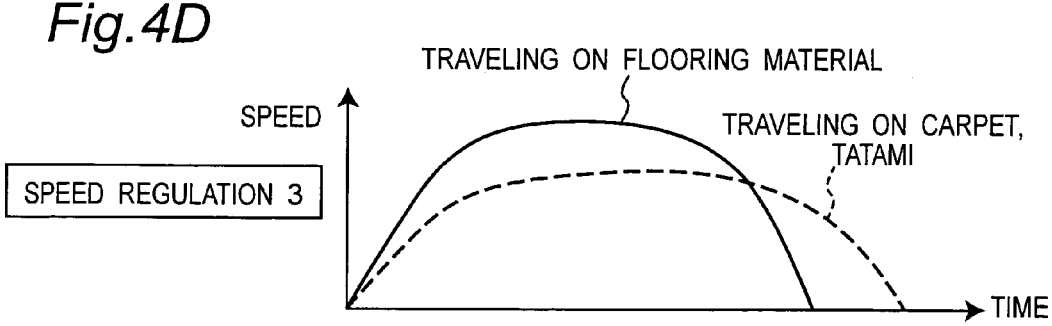
FIG. 4D is a view showing another example of the data (data containing the transporting speed of speed regulation 3) stored in the transporting information database of FIG. 4A.

Further, in the "speed regulation 3", the control content is such that the speed change is switched according to the living space for transporting the article, as shown in FIG. 4D. Different speed regulations are set for when the floor face of the living space where transportation occurs is wooden, and covered with a carpet or a tatami mat. This is because, when the floor face is the wooden flooring, the transporting device 103 (e.g., robot 50) can stably travel even at a relatively high speed since the bumps are small, whereas the traveling of the transporting device 103 (e.g., robot 50) becomes unstable at high speed when the floor face is covered with the carpet or the tatami mat. When the speed change during transportation according to the speed regulation 3 is executed, if the floor face changes from the wooden floor to the carpet, or changes the other way around, the control is switched according to the floor face after the change, which switching of the control is not sudden but is desirably smoothly switched from one control to another control so as to reduce the affect on the article being transported.

A method of determining whether the floor face is either wooden, carpeted, or covered with tatami mats is known through Japanese Laid-Open Patent Publication No. 2003-346150 and the like. Here, the Gabor Filtering processing result is assumed as the characteristic amount, and the floor face is specified from the matching degree. The method will be explained in detail using FIG. 4E.

Figure 4E:
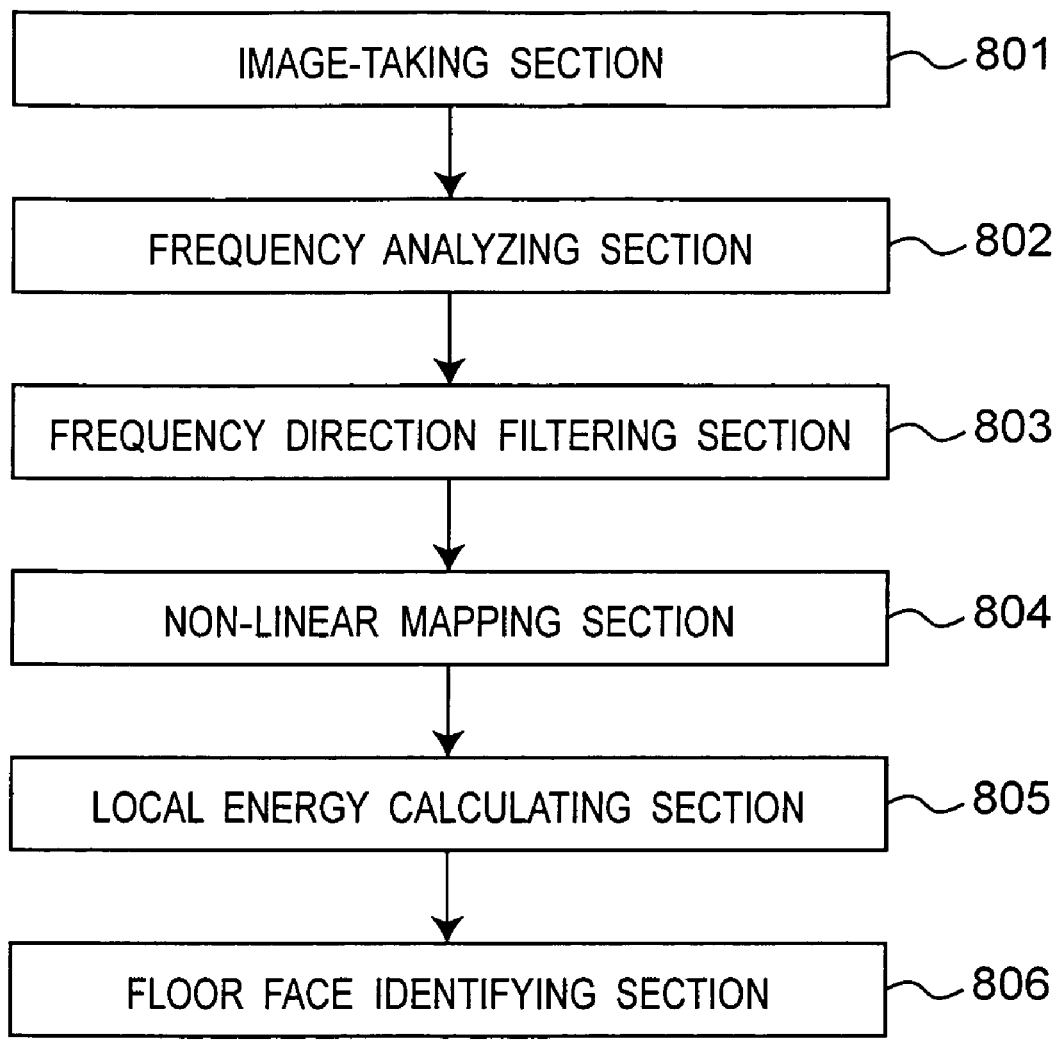
FIG. 4E is a view explaining a method for specifying the floor face with respect to the data stored in the transporting information database of FIG. 4D.

FIG. 4E is a block diagram showing the constituent element for performing a predetermined process in the order of the flow of the process for specifying the floor face. First, an image-taking section 801 uses the image-taking element such as the camera 502 to take an image of the floor face. Next, a frequency analyzing section 802 performs a fast Fourier transform on the frame image taken as above, analyzes the rise and fall and the distribution of the frequency component contained in the relevant frame image, and thereafter, a frequency direction filtering section 803 performs the Gabor filtering process in a plurality of directions for each of a plurality of types of frequency including the frequency having the most distribution and extracts the characteristic amount having selectivity in each direction of each frequency as the vector group.

Next, a non-linear mapping section 804 performs a non-linear mapping on the plurality of types of vector groups based on the frame image thereby emphasizing the white portion, and the black portions, and thereafter, a local energy calculating section 805 performs the Gaussian filtering process to obtain the local energy representing the texture characteristic of each pixel for all the pixels forming the frame image corresponding to each of the plurality of Gabor filtering directions with respect to the frame image, so that the entire frame image is in a blurred state.

Thereafter, a floor face identifying section 806 calculates an average value of the local energies of the pixel groups corresponding to the window image FW at the central portion on the lower side of each frame image, and connects all the one-dimensional vectors each having the average value as the vector amount and the corresponding direction as the vector direction, to generate a four-dimensional vector of the window image FW.

Accompanied therewith, the floor face identifying section 806 connects all the one-dimensional vectors each having the local energy of the floor face-expected pixel PF at the uppermost end of the current frame image or the region to advance as the vector amount and the corresponding direction as the vector direction, to generate the four-dimensional vector of the floor face-expected pixel PF.

In order to compare the texture characteristics of the window image FW and the floor face-expected pixel PF with the floor face identifying section 806, the Euclidean distance between the four-dimensional vector of the floor face-expected pixel PF obtained above and the four-dimensional vector of the window image FW is calculated. If the value is lower than a predetermined threshold value, the floor face displayed in the current frame image is determined to be the same type of floor face. If the value is higher than or equal to the predetermined threshold value, the floor face displayed on the current frame image is determined as a plurality of types of floor face. The floor face to be traveled on can thus be categorized.

In the transporting information database 104 shown in FIG. 4A, the "speed regulation 1" is set when the cup is in the "clean" state since no particular attention is necessary while transporting the cup; the "speed regulation 2" is set when the cup is in the "without leftover drink" state since dripping of drinks attached to the cup must be prevented while transporting the cup; and the "speed regulation 3" is set when the cup is in the "with leftover drink" state since spilling of drink must be prevented while transporting the cup.

As described above, the most suitable transportation according to the state of the article is realized by changing the form of the speed change according to the state of the article.

(Modification Example 2 of the Transporting Information)

FIG. 5 shows an example of the transporting information according to a modification example 2. The transporting information further includes the information regarding the "next state" compared to the transporting information of FIG. 3B. Thus, a plurality of transporting works is continuously and automatically performed on the article, and as a result, the user can more easily command the transporting work of the article.

Consider a case of clearing away the used cup (cup in the dirty state), for example. In this case, the dirty cup is washed in the dishwasher Dw and then stored in the cupboard Cb. That is, clearing away the used cup includes two works of carrying the cup to the dishwasher Dw and washing, and storing the washed cup in the cupboard Cb. Therefore, when the user commands the work of clearing away the cup to the robot (transporting device 103), two works of carrying the cup to the dishwasher Dw to be washed and carrying the cup washed by the dishwasher Dw to the cupboard Cb must be commanded. However, they are troublesome.

The transporting information according to the modification example 2 is configured as shown in FIG. 5, and the transporting information includes the information regarding the "next state" in addition to the information on the above mentioned "transporting operation" and the "transporting place". The information regarding the "next state" is the information regarding the state that the article takes as a result of transportation to the transporting place by the transporting device. That is, the "transporting place" for the "without leftover drink" (dirty) state is set as the dishwasher Dw, and thus the "without leftover drink" cup is changed to the state of "clean" after being washed in the dishwasher Dw. Therefore, the "next state" for the "without leftover drink" state is set as "clean". That is, the "next state" is set as shown with an arrow in FIG. 5 when the transporting place changes the state of the article (or "next state" is related as information). In the example shown in FIG. 5, since the state of the cup does not change after being transported to the cupboard Cb or transported to the refrigerator Rg for the two states of "clean" and "with leftover drink", no information exists for the "next state", and thus "–" is set.

By configuring the transporting information as above, the following transporting work is performed as hereinafter described in detail. First, the cup without leftover drink (dirty) is transported to the dishwasher Dw, and the cup is washed by the dishwasher Dw, and when the state of the cup is changed to clean, the washed cup is automatically transported by the transporting device 103 to the "cupboard" Cb serving as the transporting place set for the clean cup. Thus, according to the configuration of the transporting information of the modification example 2, when desired to continuously and automatically perform a plurality of transporting works on the article, an advantage of sequentially and efficiently describing the plurality of transporting works is obtained.

The cup is given by way of an example, but various examples other than the cup can be considered where a plurality of transporting works are desired to be performed continuously and automatically.

(Creating the Transporting Information Database)

As described above, the transporting information database 104 is configured by corresponding the operation, the place, and the like for each state with respect to each article. However, there are a wide variety of articles to be transported by the transporting device 103 in a general household, and the article to be transported changes for each household (each living space).

So, it is difficult, for example, for the user to create the transporting information database 104 for storing a large number of data by hand, and the transporting information database 104 is desirably automatically created.

The article transporting robot 10 and the article transporting system may automatically create the transporting information database 104 as described below. That is, the article transporting robot 10 and the article transporting system learn how the article to be transported is transported by humans, and the transporting information database is created based on the learnt result.

On the assumption that the transporting information database 104 is automatically created, the ID tag Tg that can detect the three-dimensional position of the article and has ID (identification) information thereof is attached to each article. The tag Tg using ultrasonic wave is known as the tag Tg that can detect the three-dimensional position (e.g., Yoshifumi Nishida, Hiroshi Aizawa, Toshio Hori, and Masayoshi Kakikura, "Robust measurement of the daily activities of humans using an ultrasonic three-dimensional tag-robust positional estimation based on redundant sensor information", Collected Papers from the 20th Annual Conference of the Robotics Society of Japan, 3C18, 2002). The article provided with such tag Tg can have the position of the article detected in a time-series manner to detect the moving trajectory of the article, whereby the way the humans handle the article can be detected.

For instance, since the humans throw clothes into the room when taking in the clothes being hanged to dry, the moving speed becomes high and the direction the clothes is being moved is not regulated. When carrying the dish into the kitchen, it must be done carefully so as not to drop the dish, and thus the moving speed of the article becomes low, and further, when leftovers and the like are on the dish, the dish is carried with the orientation thereof being upward.

The transporting operation of the article performed by humans in this manner is recognized using the state recognizing means 101, for example, and the recognized result (recognized information) is stored as the transporting information. That is, the transporting information of the article is recognized using the state recognizing means 101 by recognizing the movement of the ID tag Tg attached to the article, and the recognized result (recognized information) is stored in the transporting information database 104 as transporting information. In the above example, since the clothes are thrown into the room when taking in the clothes that is being hanged to dry, the ID tag Tg attached to the clothes being thrown into the room is detected (recognized) by the tag reader arranged at the window and the room, respectively or the camera 502 arranged on the ceiling, and the moving speed is also detected (recognized). Such detected (recognized) transporting information is stored in the transporting information database 104 as the temporary transporting information. Further, when humans carry the table ware into the kitchen, the humans carefully carry the table ware so as not to drop them, and thus the moving speed of the ID tag Tg attached to the table ware being low is detected (recognized). When leftovers and the like are on the table ware, carrying the table ware with the orientation being upward is detected (recognized) by the camera 502 arranged at the ceiling and the like, and the detected (recognized) transporting information is stored in the transporting information database 104 as the temporary transporting information. If the reliability of the temporary transporting information recognized in this manner is higher than or equal to a predetermined value (e.g., similar temporary transporting information is stored over a predetermined number of times), it is registered in the transporting information database 104 as the usable transporting information. Registration to the database 104 may be performed by the transportation method specifying methods 102, or may further include a learning means and be performed by the learning means. Preferably, the ID tag Tg is given to humans, and is desirably recognized as the operation of humans.

The reliability of the recognizing information may be set by the frequency and the number of the recognized information. For example, the number of times a certain article that has been recognized by the ID tag Tg has been moved may be the reliability, or, when the article is moved with respect to the article recognized by the ID tag Tg, the frequency of the most frequent transportation method may be the reliability.

Thus, by creating the transporting information by learning, the transporting information does not need to be set in advance, and the appropriate transporting information can be created since the transporting information is learnt based on the transporting operation performed by humans.

As explained above, the transporting information database 104 is the database for storing the information in which the state of the article and the transporting operation and the transporting place are corresponded as the knowledge of adopting the most suitable transportation method corresponding to the relevant state when transporting the article. The data containing each state of the article, and the transporting operation and the transporting place (and the information regarding the next state) corresponding to the state is referred to as "transporting basic data", and the information unit containing the article and the transporting basic data is referred to as "transporting data".

(State Recognizing Means)

The state recognizing means 101 is a means for recognizing the article to be transported and for recognizing the state of the article. The state recognizing means 101 uses various sensor such as the camera (e.g., camera 502 serving as one example of the state recognizing means 101), the laser, the temperature sensor, the weight sensor, and the RFID tag and the tag reader (or reader/writer) alone or in combination, a processing part for processing the information detected by various sensors as necessary, and the database for storing the data necessary for processing in the processing part, to perform the detection of the article to be transported and the recognition of the state of the article. The recognizing method of the state of the article will now be explained using a specific example.

First, the recognition (detection) of the article to be transported will now be explained. That is, the camera is preferably used for the detection of the article. That is, the article is image-taken by the camera, and the article is specified based on the taken image (picture) As one example, one or a plurality of cameras 502 may be arranged at the ceiling 90 in the living space, as shown in FIG. 2A, or one or a plurality of cameras 502 may be attached to the robot 50, as shown in FIG. 8. Various methods have been developed for an image recognizing method performed at the recognition processing part 101$p$ using the image taken by the camera 502, and it is possible to employ methods described in such as, "Image Recognition in Eigenspace Method" written by Hiroshi Murase, in "Technical Review and Future Views in Computer Vision", Shin Gijutu Communications, pp. 206-218. A stereo camera is used to enhance the recognizing precision of the article, and the detection of the article to be transported may be performed using the shape of the article.

Other methods for detecting the article to be transported also include a method using the ID code. That is, the ID code for specifying each article is attached to the article, and detection of the article to be transported is performed by detecting the code with the camera 502. The most widely used optical code (e.g., barcode, two-dimensional code etc.) may be used for the code. In this case, the camera is preferably used as the means for detecting the code.

The RFID tag Tg may be used as a new code recently given attention. The RFID tag Tg is a device including the IC for storing the data and an antenna that can wirelessly transmit the data, and is a device that can write the data to the tag Tg and read the data from the tag Tg by means of the tag reader (reader/writer) TR.

When using the RFID tag Tg, the data related to the article (e.g., data of types, date of manufacture, shape, weight, article image, and the like of the article) are embedded in the RFID tag Tg. When there is not enough storage capacity in the RFID tag Tg, the link information (e.g., internet address etc.) of a place for storing the data related to the article may be embedded in the RFID tag Tg. In this case, the data related to the article may be acquired by acquiring the link information by the tag reader TR, and accessing the acquired link information.

When the RFID tag Tg is attached to each article, the detection of the article to be transported is performed by arranging a number of tag readers TR in the living space (e.g., in the house of a general household), and reading the data of the RFID tag Tg with one of the tag readers TR.

Here, since a very weak radio electric wave that does not affect the human body must be used in the transmission and reception of the data between the RFID tag Tg and the tag reader TR, the RFID tag Tg has a disadvantage in that the communicating distance thereof is very short or at most a few dozen cm. Therefore, an extremely large number of tag readers TR must be arranged in the living space to detect the article. The tag reader TR is higher than the camera in terms of cost, and thus is not realistic to arrange a large number of tag readers TR in the living space.

The detection of the article may be performed by performing the process combining the tag reader TR and the camera. That is, the tag reader TR may be arranged at the place where the article enters and exits, such as the door or the like of the room, and the entering and exiting of the article may be detected by the tag reader TR. For instance, as shown in FIG. 2D, the tag reader TR91 is arranged near the window 91, and the tag reader TR92 is arranged near the door 92. Each tag reader TR91, TR92 is one example of the state recognizing means 101. The state recognizing means 101 and the transporting information managing server 401 are connected as described above. The presence of the article inside the room can be ascertained by arranging the tag reader in this manner, and detecting the entering and exiting of the article. The tag readers TR are arranged inside the room at a predetermined arrangement density. For instance, as shown in FIG. 7F, the tag readers TR1 to TR9 are arranged on the floor of the room at a predetermined interval, thereby forming a plurality of receiving regions of the tag readers TR1 to TR9. At which position in the room the article is present is broadly narrowed down according to the arrangement density of the tag readers TR. After specifying the approximate position of the article, the article is image-taken by using the camera 502 to perform detection. In this manner, the enhancement of the detection precision is realized by performing the detection of the article by combining the tag reader TR and the camera 502.

The tag reader TR is not only arranged in the living space, and may be arranged in the transporting device 103 that can move through the living space. That is, the tag reader TR is arranged on the arm 51 or the hand 52 of the robot 50, and the information of the RFID tag Tg given to the article can be read by the tag reader TR by moving the robot 50 and having the arm 51 and/or hand 52 approach the article. This configuration is effective when the position of the article to be transported can be specified to a certain extent.

A method using the image taken by the camera, a method using the code image-taken with the camera, and a method using the image and the code image-taken by the camera are explained as methods for detecting the article to be transported, but is not limited thereto.

Next, the recognition of the state of the article by the state recognizing means 101 will be specifically explained with reference to the drawings.

(Recognition of a State of Whether or Not Drink is In a Cup By the State Recognizing Means 101)

First, a method of recognizing a state of whether or not there is drink in a cup as a state of an article will now be described. As described above, the most suitable transportation method changes depending on the state of whether or not there is drink in the cup (refer to FIG. 3B, FIG. 4A, FIG. 5).

A method of recognizing whether or not there is drink in the cup includes a method using the refraction of light. The cup is assumed to have light transmissivity.

FIG. 6A and FIG. 6B are views showing the configuration serving as one example of the state recognizing means 101 for performing the recognition of the content of a cup 201 using the refraction of the light. The state recognizing means 101 includes a light source 503 for irradiating the laser beam 503$g$ onto the cup 201, a camera 502 serving as one example of the image-taking device for image-taking the state in which the light is projected onto the cup 201, and a recognition processing part 101$p$ for performing recognition processing on the information image-taken by the camera 502. The light source 503 preferably irradiates the light 503$g$ having strong directivity, and may be a laser irradiating device as examples. The camera 502 only needs to be such that can detect the trajectory of the laser beam 503g irradiated from the laser irradiating device 503. The laser irradiating device 503 and the camera 502 are preferably attached to the arm 51 of the robot 50, as shown in FIG. 8, so that the position (position coordinate) thereof can be changed. When the robot 50 is a humanoid robot, the camera 502 may be embedded in the face.

The state recognizing means 101 irradiates the laser beam 503g onto the cup 201 from the laser irradiating device 503 in recognizing the content of the cup 201.

Normally, since the index of refraction of the air and the index of refraction of the liquid are different (e.g., index of refraction of air is 1.0, index of refraction of water is about 1.33), the trajectory of the laser beam 503g changes depending on whether or not liquid is in the cup 201. That is, as shown in FIG. 6A, since the inside of the cup 201 and the outside of the cup 201 are filled with air when the cup 201 is empty, the laser beam 503g irradiated diagonally from above onto the cup 201 moves straight, as shown in the figure. When water 201a is in the cup 201, as shown in FIG. 6B, the irradiated laser beam 503g is refracted since the index of refraction of air and the index of refraction of water are different.

The cup 201 is image-taken by the camera 502 while the laser irradiating device 503 irradiates the laser beam 503g, thereby the trajectory of the laser beam 503g is detected. The recognition processing part 101p of the state recognizing means 101 recognizes whether or not liquid is inside the cup 201 based on the detected result.

Since the index of refraction of light differs depending on the object (material), the material of the object inside the cup 201 can be detected by detecting the angle of refraction of the laser beam 503g. Thus, considering the material of the object in the cup 201 as one state of the article, the transportation of the article can be optimized according to the material of the object. For instance, when the liquid in the cup 201 is water, the work of transporting the cup 201 to the sink Ks in the kitchen to throw out the water in the cup 201, and thereafter, transporting the cup 201 to the cupboard Cb may be performed. On the other hand, when the liquid is other than water, the work of transporting the cup 201 to the sink Ks in the kitchen to throw out the liquid inside, and thereafter, transporting the cup 201 to the dishwasher Dw may be performed.

The presence of the content of the cup 201 is recognized based on the trajectory of the laser beam 503g, but is not limited to the recognition using the refraction of light. For instance, the object in which the relative position with respect to the camera 502 is apparent may be image-taken with the camera 502 through the cup 201, and the presence of the content of the cup 201 may be recognized by detecting at which position on the cup 201 the object appears. In this case, the photographed article may use the object present in the living space (room in the general household).

The state of whether or not drink is in the cup 201 may be recognized by image-taking the way humans handle the article using the camera 502, and detecting the transportation method of the article from the taken image. The method for detecting the transportation method is known (e.g., Kentarou Hashimoto, Kouichi Ogawara, Atsushi Takamatu, and Katsufumi Ikeuchi, "Recognition of gripping shape through visual volume intersection method using infrared image", Computer Vision and Image Media Vol. 135 No. 10, pp.55-62, 2002), and thus the detailed explanation will be omitted. The camera used for recognizing the article may be used or a different camera may be used for the camera 502.

(Recognition of the State of Whether or Not Food Particles Are On the Table Ware By the State Recognizing Means 101)

A method of recognizing the state of whether or not the food particles are on the table ware as the state of the article will now be explained. As described above, the most suitable transportation method changes depending on the state of whether or not the food particles are on the table ware (refer to FIG. 3A).

The state of whether or not the food particles are on the table ware is recognized by recognizing the material of the surface of the table ware.

That is, the types of table ware can be specified based on the information of the RFID tag Tg as examples, but the state of whether or not the food particles are on the table ware cannot be stored in the RFID tag Tg in advance as information since the state changes with respect to time. Further, when detecting the weight of the table ware by means of the weight sensor to detect the presence of the food particles, the presence of the food particles cannot be detected if the amount of food particles is small and is difficult to be detected by means of the weight sensor.

When the material of the surface is substantially uniform across the entire surface such as the table ware, the presence of the food particles can be precisely detected using the information of the material. The reflectance parameter can be used as the information of the material. The reflectance parameter is the parameter that depends on the material of the article, and can be detected using the light source for irradiating the light onto the object and the image-taking device, such as the camera, for image-taking the object. As shown in FIG. 8, the camera 502 and the light source 503 (this light source does not need to be a laser irradiating device in this example) are attached to the arm 51 of the robot 50, and the reflectance parameter may be detected by the camera 502, the light source 503, and the recognition processing part 101p. The method of detecting the reflectance parameter is known, and thus the explanation thereof will be omitted.

The recognition of the presence of the food particles using the reflectance parameter is performed as described below. That is, the information of the reflectance parameter of the table ware is stored in the RFID tag Tg of each relevant table ware. The reflectance parameter of the table ware is actually detected by the light source 503, the camera 502, and the recognition processing part 101p, and the reflectance parameter stored in the RFID tag Tg and the reflectance parameter detected by the recognition processing part 101p are compared. When both parameters are the same, determination is made that there is nothing on the table ware, that is, there is no food particle. When the two parameters are sufficiently different, determination is made that there is something on the table ware, that is, there is food particle. Alternatively, the reflectance parameter of the food particle may be obtained in advance, and the actually detected reflectance parameter and the reflectance parameter of the food particle may be compared.

At that time, the reflectance parameter of the plate is detected at a plurality of points on the plate, and determination is made on "clean", "dirty", "with food particles", and "with leftovers" by using the reflectance parameter matching degree representing the extent of matching between the detected parameter and the reflectance parameter stored in the RFID tag Tg (refer to "reflectance parameter matching degree" of FIG. 3A. Each reflectance parameter matching degree of "clean", "dirty", "with food particles", and "with leftovers" is greater than or equal to 99%, 90-99%, 80-90%, and less than or equal to 80%.) The reflectance parameter matching degree Ep is expressed with the following equation.

$$Ep=\text{Num\_match}/\text{Num\_points} \qquad \text{(Equation 2)}$$

The Num_points represent the number of points where reflectance parameter is detected, and the Num_match represents the number of points matching with the stored reflectance parameter out of the detected reflectance parameters.

For instance, assume the reflectance parameters of 200 points on the plate are detected. Among them, 185 points are equal to the reflectance parameters stored in the RFID tag. The matching degree of the reflectance parameter defined as follows.

$$185/200=0.925 \qquad \text{(Equation 3)}$$

Namely, 92.5%. From "reflectance parameter matching degree" of FIG. 3A, the plate is determined to be "dirty".

Therefore, the state recognizing means 101 recognizes the state of the article using the camera, the tag reader, and the like. The state recognizing means 101 can also detect the state of the article using other sensors such as the weight sensor and the like according to the types of the state of the article. That is, since there are various states to be detected, the most suitable recognizing method is adopted according to the state to be detected.

(Recognition of the State of the Article Using Inference By the State Recognizing Means 101).

In the above recognizing methods, the state of the article is recognized based on the detected data of various sensors 101a, but the state recognizing means 101 may be configured by various sensors 101a, the inference processing part 101g for performing inference on the basis of the detected data of various sensors 101a, database such as article movement history database 101d for storing the movement history of the article detected by the various sensors 101a, as shown in FIG. 2F, to recognize the state of the article. The inference by the inference processing part 101g will now be explained taking a case of recognizing whether or not the clothes is dirty by way of an example. The most suitable transportation method (transporting place) changes depending on the state of whether or not the clothes is dirty, for example, transporting the clothes to the washing machine when it is dirty and transporting the clothes to the drawers when it is not dirty, when cleaning away the clothes placed in the room.

Based on such recognition and assuming the RFID tag Tg is attached to the clothes CL, the tag readers (e.g., tag reader TR91 near the window 91, tag reader TR92 near the door 92) are arranged at the entrance and the exit (e.g., porch, doorway of each room, doorway of the balcony) of the house including the room where the clothes CL is placed (refer to FIG. 2D).

By arranging the tag readers TR at the entrance and the exit of the house, when a human wearing the clothes CL passes through the doorway or when a human holding the clothes CL passes through the doorway, such state is detected by the tag reader TR. The detected result is sequentially stored in the article movement history database 101d and the movement history of the clothes CL is obtained.

FIG. 2E shows such condition. The tag readers TR11 to TR17 are arranged at the doorways 1 to 7 in FIG. 2E to detect entering and exiting of the article or human. Similar tag reader TRw is arranged at the opening of the washing machine Wm of FIG. 2E.

By referencing the movement history stored in the article movement history database 101d in such state with the inference processing part 101g, assumption is made as one example that the clothes CL is in a room 95a at the current point in time, but the clothes passed a porch 95b (passed the tag reader TR12 of the doorway 2) at one point in time before the current point in time, and the clothes CL passed the porch 95b (passed the tag reader T11 of the doorway 1) at the point in time before that. In this case, the clothes CL is assumed to have been placed in the room 95a after the person wearing the clothes CL has gone out and come back to the house. Thus, the clothes CL in the room 95a can be inferred by the inference processing part 101g that the clothes CL is dirty.

As another example, by referencing the movement history stored in the article movement history database 101d with the inference processing part 101g, for example, assumption is made that the clothes CL is in the room 95a at the current point in time, but the clothes passed the doorway of a balcony 95c (passed the tag reader TR14 of the doorway 4) at one point in time before the current point in time, and the clothes CL was in the washing machine Wm (passed the tag reader TRw of the door of the washing machine Wm) at the point in time before that. In this case, it is assumed that the clothes CL that have been washed in the washing machine Wm is hanged for dry in the balcony 95c, and then placed in the room 95a. Thus, the clothes CL placed in the room 95a can be inferred by the inference processing part 101g that the clothes CL is not dirty.

By recognizing the state of the article using such inference, the state of the article that is difficult to detect only with the various sensors 101a can be recognized relatively easily by using the recognition processing part 101p that appropriately processes the detected data of the various sensors 101a, or using the inference processing part 101g and the article movement history database 101d.

(Recognition of the State of Whether or Not the Articles Are Stacked By the State Recognizing Means 101)

Next, a method of recognizing whether or not another article is stacked on the article to be transported (article exists alone or stacked with another article) will be explained. As described above, the most suitable transporting operation changes depending on whether or not another article is stacked on the article to be transported (refer to FIG. 3C). This recognition is possible through inference using the weigh sensor 101b and the tag reader 101c, as another example of the sensor 101a.

Figure 7A:
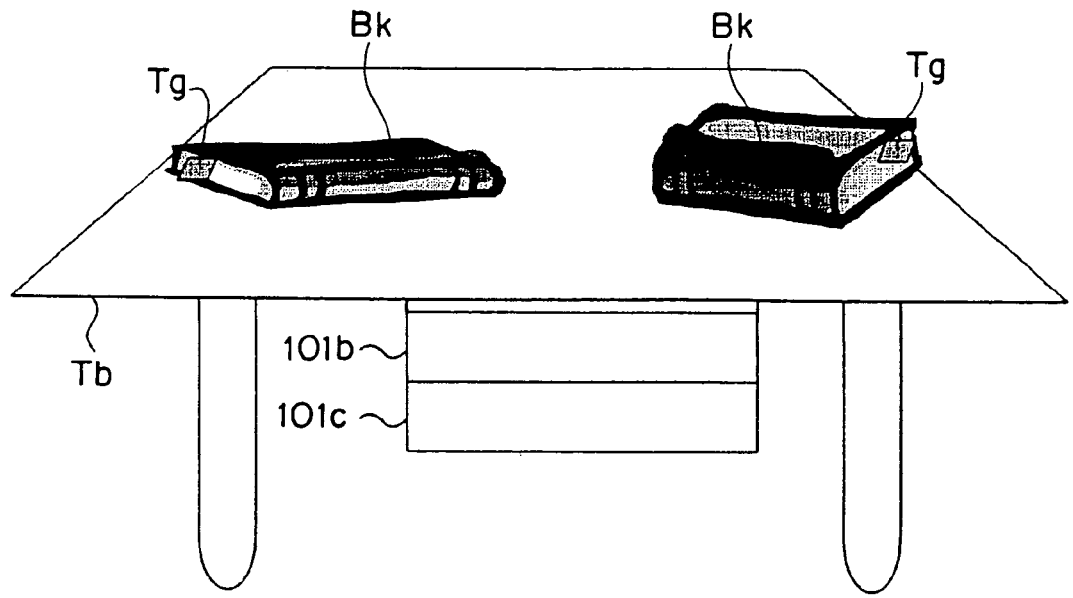
FIG. 7A is an explanatory view showing an example of a state recognizing means using a weight sensor and a tag reader in the article transporting system or the article transporting robot according to the embodiment of the present invention.
Figure 7B:
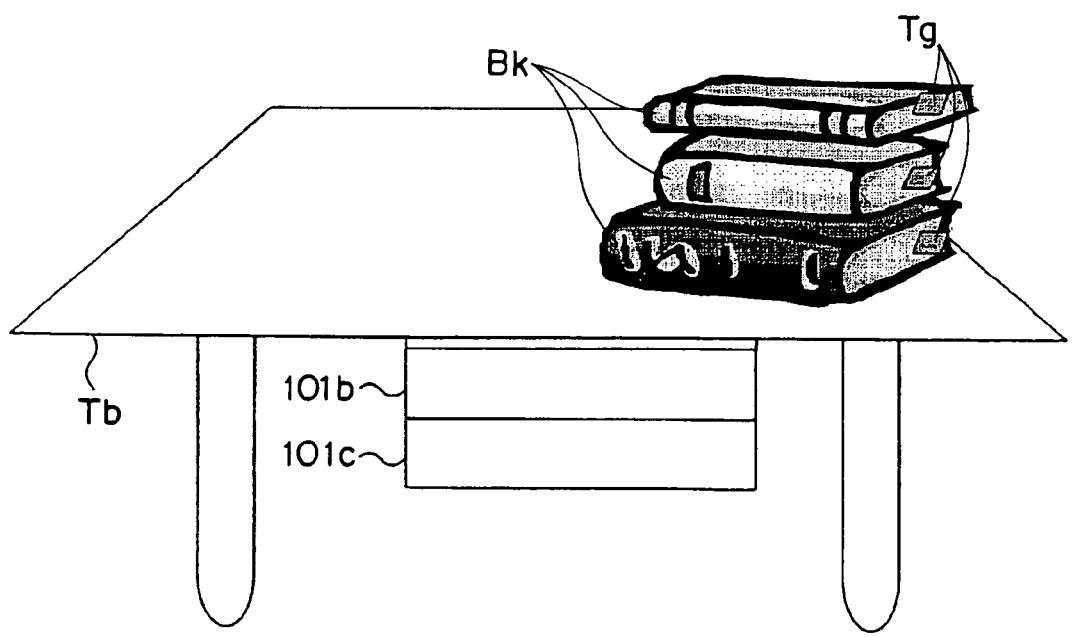
FIG. 7B is an explanatory view showing an example of the state recognizing means using the weight sensor and the tag reader in the article transporting system or the article transporting robot according to the embodiment of the present invention.

FIG. 7A and FIG. 7B are views explaining the recognition using the weight sensor 101b and the tag reader 101c. That is, the state recognizing means 101 further includes the weight sensor 101b and the tag reader 101c, which weight sensor 101b and the tag reader 101c are arranged on the table Tb. It is assumed that the weight sensor 101b can detect the weight of the article placed on the table Tb and the approximate position of the center of gravity of the article. It is assumed that the tag reader 101c can read the information of the RFID tag Tg of the article placed on the table Tb.

Figure 7C:
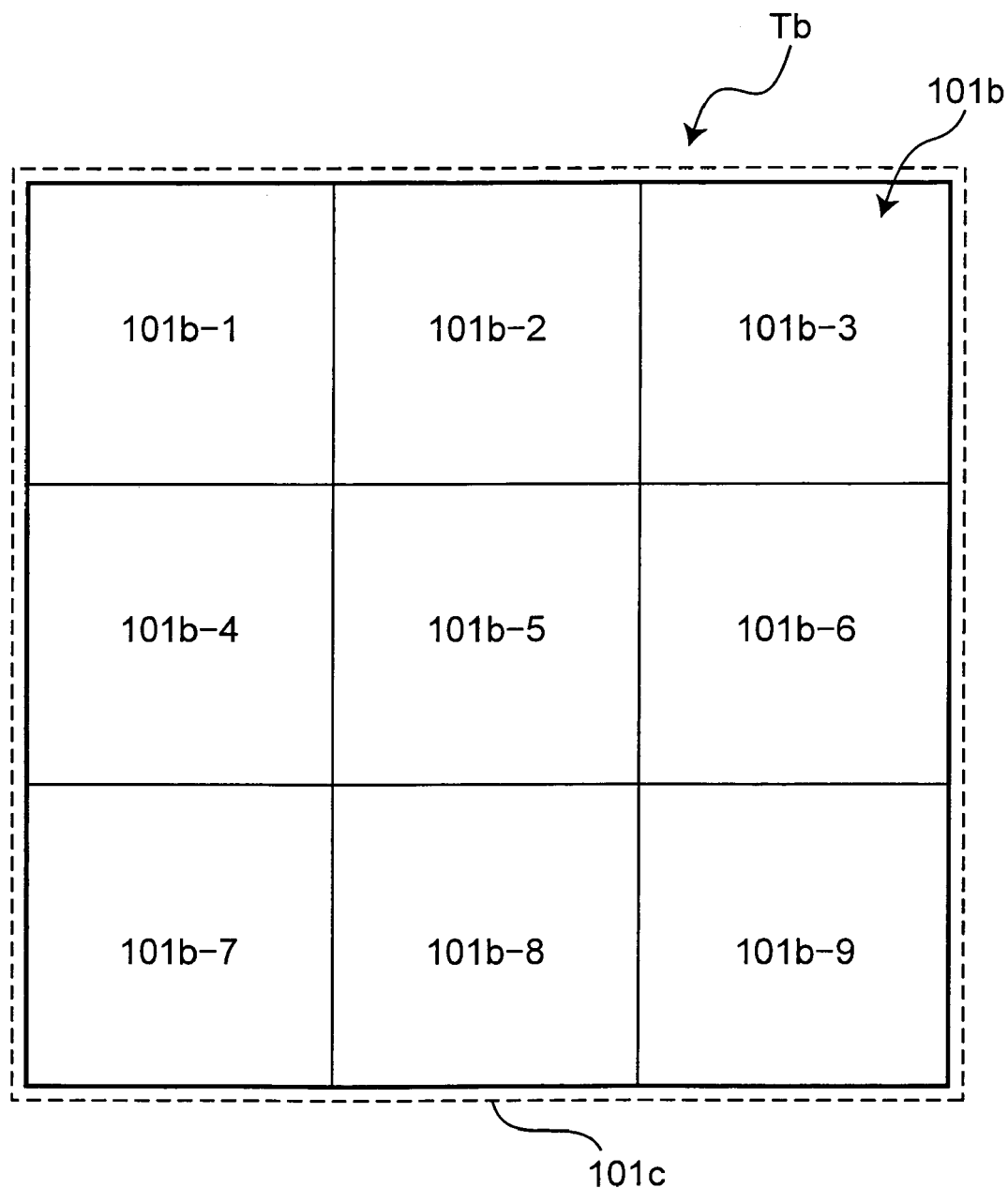
FIG. 7C is an explanatory view showing an example of the state recognizing means using the weight sensor and the tag reader in the article transporting system or the article transporting robot according to the embodiment of the present invention.

As shown in FIG. 7C, a plurality of (nine in the example) of weight sensors 101b-1 to 101b-9 and one tag reader 101c are arranged on the table Tb. Each weight sensor 101b-1 to 101b-9 measures the weight placed on only one part of the table Tb, as shown in FIG. 7C. The tag reader 101c can also detect the RFID tag Tg placed anywhere as long as the RFID tag Tg is on the table Tb. Assuming the RFID tag Tg has an anti-collision function, the information of each article can be distinguished and read even if a plurality of articles are stacked.

A first state in which two books Bk are arranged on the table Tb at different positions from each other, as shown in FIG. 7A, and a second state in which three books Bk are placed on the table at one position in a stacked state are considered.

Figure 7D:
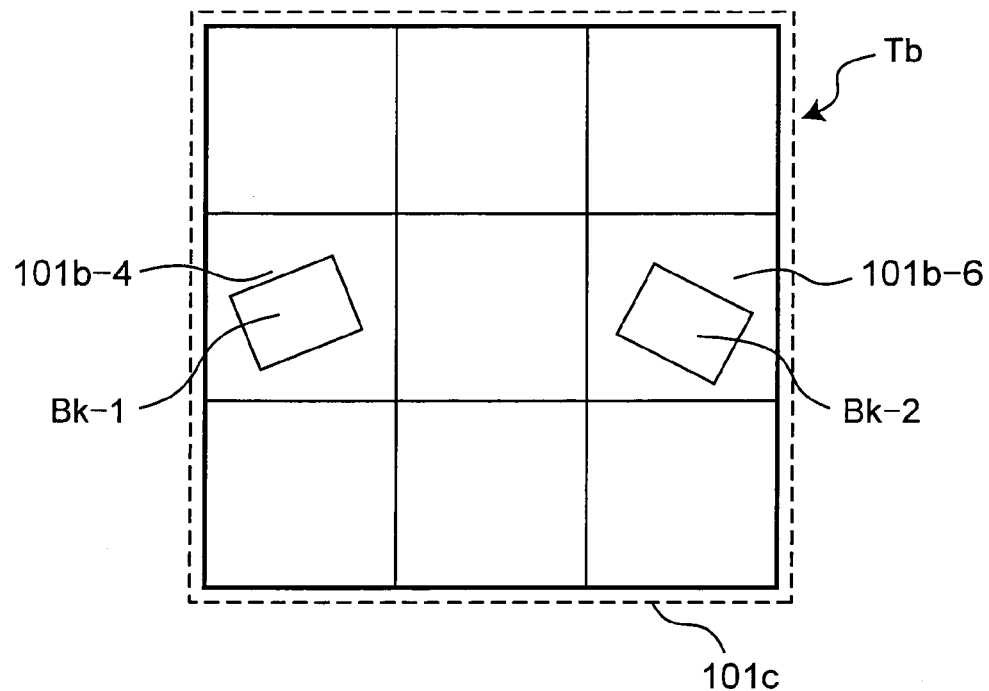
FIG. 7D is an explanatory view showing an example of the state recognizing means using the weight sensor and the tag reader in the article transporting system or the article transporting robot according to the embodiment of the present invention.

FIG. 7D shows the first state of FIG. 7A. Here, both of the two books (books Bk-1, B1-2) are detected by the tag reader 101c, but the book Bk-1 is only detected by the weight sensor 101b-4 and the book Bk-2 is only detected by the weight sensor 101b-6. Thus, the weight sensor 101b detects that an object having two centers of gravity is placed on the table Tb.

Figure 7E:
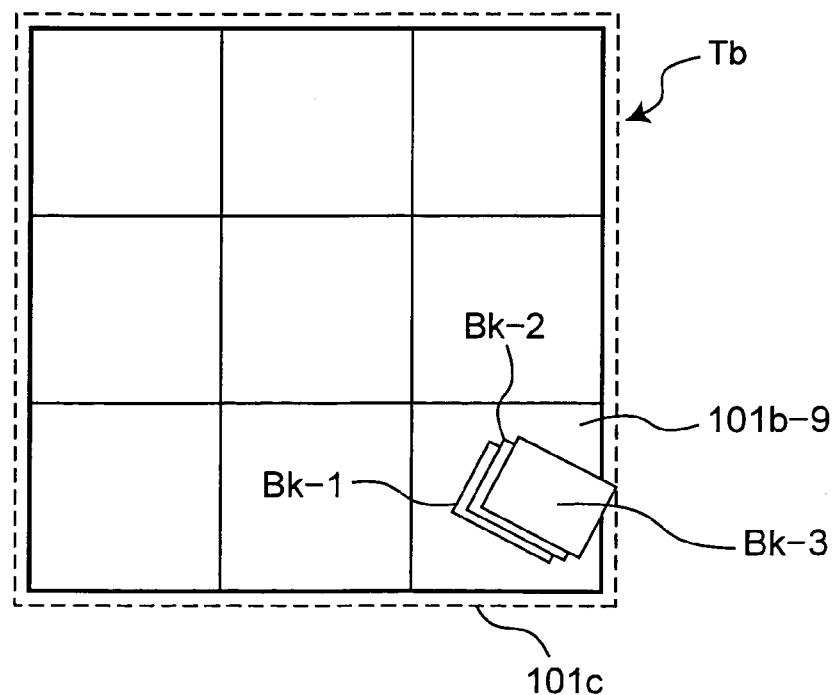
FIG. 7E is an explanatory view showing an example of the state recognizing means using the weight sensor and the tag reader in the article transporting system or the article transporting robot according to the embodiment of the present invention.
Figure 7F:
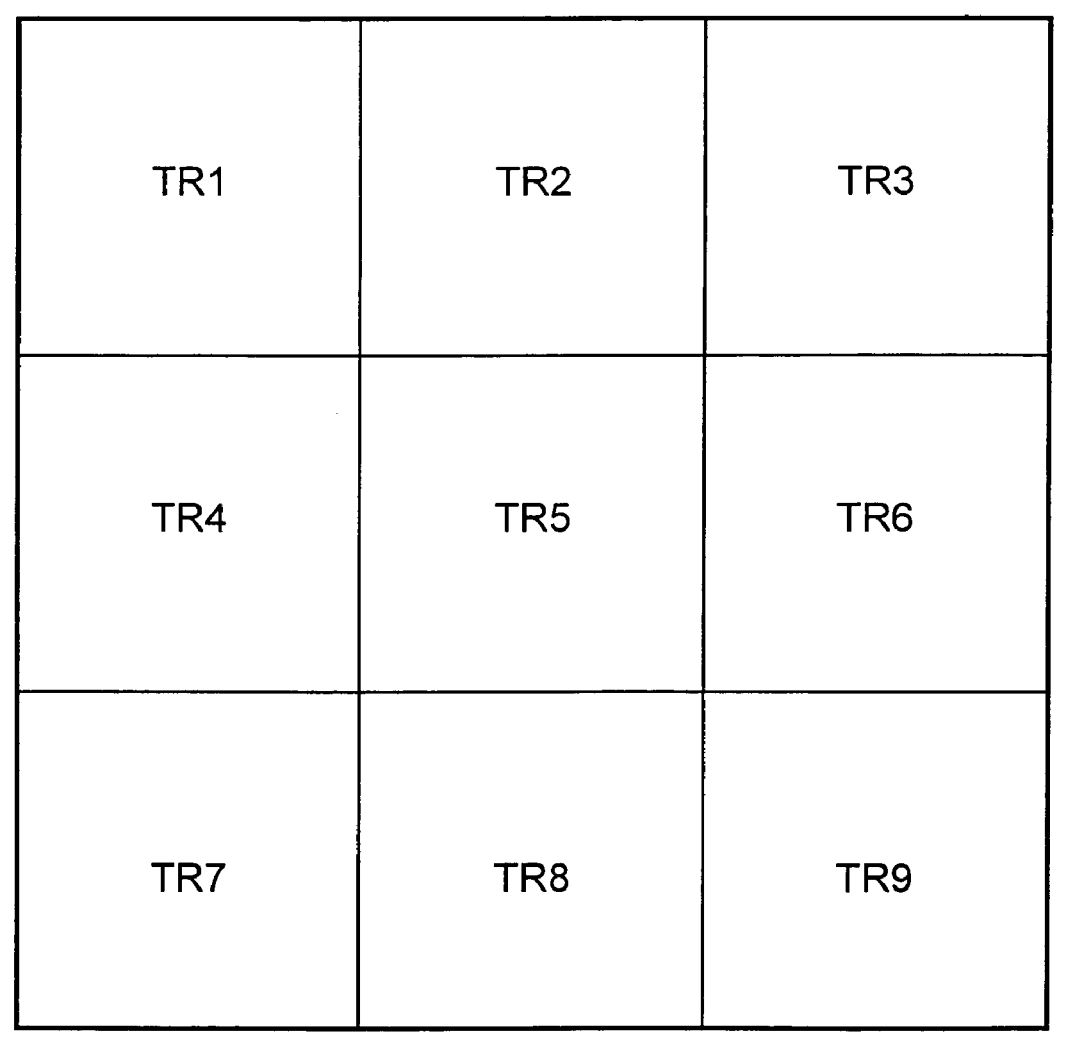

FIG. 7E shows the second state of FIG. 7B. Here, since the three books (books Bk-1, Bk-2, Bk-3) are stacked, detection is made only by the weight sensor 101b-9, and detection by other weight sensors 101b is not made. Thus, the weight sensor 101b detects that an object having only one center of gravity is placed on the table Tb. Further, the presence of three books Bk-1, Bk-2, Bk-3 is detected by the tag reader 101c.

Thus, when two states are detected by the weight sensor 101b and the tag reader 101c, the following are detected by the respective sensors 101b, 101c.

<First State>

Tag reader 101c: the presence of two books Bk, and the weight of each book Bk;

Weight sensor 101b: the weight, and the existence of the position of the center of gravity at two locations <Second State>

Tag reader,101c: the presence of three books Bk, and the weight of each book Bk;

Weight sensor 101b: the weight, and the existence of the position of the center of gravity at one location Obviously, similar processes may be performed by arranging the tag readers TR1 to TR9 on the table Tb at a predetermined interval and thus preparing a plurality of receiving regions of the tag readers TR1 to TR9, as shown in FIG. 7F. At that time, the weight of the article is acquired by the tag information detected by the tag readers TR1 to TR9.

The weight (total value) of each book Bk read by the tag reader 101c and the weight of each book Bk detected by the weight sensor 101b are then compared, for example, by the inference processing part 101g. Consequently, when no significant difference exists between the two, the article placed on the table Tb is determined to be only the book Bk and the number of books Bk is also determined.

The positions of the center of gravity detected by the weight sensor 101b and the number of books Bk that has been determined are compared. In the first state, the number of books Bk is two, and the number of positions of the center of gravity is two. In the second state, the number of books Bk is three, and the number of positions of the center of gravity is one.

Therefore, the fact that the article exists alone can be recognized by determining whether or not the following two conditions are satisfied with the inference processing part 101g or the like.

First condition: The weight based on the information of the RFID tag Tg and the weight detected by the weight sensor 101b are substantially the same.

Second condition: The number of articles detected by the tag reader TR and the number of positions of the center of gravity detected by the weight sensor 101b match.

That is, it can be recognized in the inference processing part 101g that the article exists alone when determination is made in the inference processing part 101g that both the first condition and the second condition are met; and that the articles are stacked when determination is made in the inference processing part 101g that the first condition is met but the second condition is not met.

The method of recognizing the article with the state recognizing means 101 explained above is merely one example, and the article may take various states other than the states explained herein. In this case, the state of the article is sometimes not recognized in the recognizing method explained above, but various states of various articles can be recognized by combining the recognizing method explained above and other methods and appropriately adopting the most suitable recognizing method according to the type of state.

Similarly, the transporting speed may be changed depending on the number of stacked articles, for example, the number of books Bk. Thus, when transporting a large number of stacked articles, the transporting work of a large number of articles can be performed safely by the transporting device 103 (e.g., robot 50) by having the transporting device 103 (e.g., robot 50) move at low speed so as not to drop the stacked articles.

(Transportation Method Specifying Means)

The transportation method specifying means 102 specifies the transportation method according to the state from a plurality of transportation methods of the relevant article based on the article and the state thereof recognized by the state recognizing means 101, and the transporting information database 104.

Specifically, the transportation method specifying means 102 receives the data regarding the state of the article recognized by the state recognizing means 101 and references the transporting data of the relevant article stored in the transporting information database 104. Then, the transporting basic data (i.e., data containing each state of the article, transporting operation and transporting place corresponding thereto (and information regarding the next state)) corresponding to the recognized state is selected. After selecting the transporting basic data, the transportation method specifying means 102 transmits the selected transporting basic data to the transporting device 103.

When the transporting basic data stored in the transporting information database 104 includes information regarding the "next state" as shown in FIG. 5, if the state of the article is changed through execution of one transporting work, the transportation method specifying means 102 newly selects the transporting basic data corresponding to the changed state, and transmits the newly selected transporting basic data to the transporting device 103. The selection and transmission of the transporting basic data are then repeated.

At that time, the next transporting work is desirably performed after the completion of the previous transporting work. The point in time of completion of the transporting work can be changed according to the transporting place, and for example, in the example of the cup shown in FIG. 5, since a state of the cup transported to the cupboard Cb does not change thereafter in the work of transporting the cup to the "cupboard" Cb in the "clean" state, the point in time at which the cup is transported to the cupboard Cb is the point in time of completion of the transporting work. In the work of transporting the cup to the "dishwasher" Dw in the "without leftover drink" state, the cup transported to the dishwasher Dw is thereafter washed and changed to the "clean" state, and thus the point in time of after being washed in the dishwasher Dw is the point in time of completion of the transporting work instead of the point in time at which the cup is transported to the dishwasher Dw. In this case, the dishwasher Dw is preferably connected to the transportation method specifying means 102 through the wired and/or wireless network to provide the information of completion of washing from the dishwasher Dw to the transportation method specifying means 102 (see FIG. 2C).

(Transporting Device)

The transporting device 103 performs transportation of the article according to the transportation method specified by the transportation method specifying means 102. To this end, the transporting device 103 includes at least one of the followings:

1) A function for understanding the transportation method and the transporting place written in the transporting basic data and executing the program according thereto, and 2) A physical structure for transporting the article and the physical structure for gripping and releasing the article.

First, with regards to 1), the transporting data shown in FIG. 3A and the like are described on the basis of natural language, but the data provided to the transporting device 103 are numerical parameters related to orientation and speed.

The transporting device 103 is installed with article transporting program, and executes the program according to the parameter values related to the read orientation and speed to transport the article. These techniques are generally performed in the industrial robot conventionally known, and thus the detailed explanation will be omitted.

An existing robot may be used for the transporting device 103, but in such case, the numerical parameter related to the transporting basic data may not be read by the program installed in the existing robot. In this case, the information translation program and the like are additionally installed in the existing robot, so that the numerical parameter related to the transporting basic data can be used with the program installed in the existing robot. Further, in this case, the information on orientation or speed related to the transporting basic data are preferably described using XML and the like, which is one standard descriptive format.

With regards to 2), the physical structure for transporting the article, and the physical structure for gripping and releasing the article are already put into practical use in the robot of industrial field, and thus the detailed explanation of the technical subject thereof will be omitted. One example of a simple structure has been explained using FIG. 8.

(Transporting Process In the Article Transporting Robot or the Article Transporting System)

The transporting process in the article transporting robot or the article transporting system 10 will now be explained with reference to a flow chart of FIG. 9. It is assumed that the transporting information database 104 is the configuration shown in FIG. 5.

First, in step S601, the state recognizing means 101 recognizes the article to be transported and the state of such article and transmits the recognized result to the transportation method specifying methods 102.

In the following step S602, the transportation method specifying means 102 searches for the transporting data related to the relevant article from the transporting information database 104 based on the received recognized result. Determination is then made (step S603) on whether or not the transporting data matching the recognized article is found (whether or not data exists), and when found, the process proceeds to step S604, and when not found, the process is terminated.

In step S604, the transportation method specifying means 102 acquires the transporting data from the transporting information database and searches for the transporting basic data corresponding to the state of the article from the transporting data. Determination is made (step S605) on whether or not the transporting basic data is found (whether or not data exists) and when found, the process proceeds to steps S606, and when not found, the process is terminated.

In step S606, the transportation method specifying means 102 acquires the transportation method and the transporting place from the searched transporting basic data and transmits the acquired information to the transporting device 103.

In step S607, the transporting device 103 receives the information sent from the transportation method specifying means 102 and executes the transportation of the article according to the transportation method and the transporting place.

In step S608, the transportation method specifying means 102 determines whether or not information about the next state is described in the transporting basic data acquired in step S606, and when not described, the process is terminated, and when described, the process returns to step S604 and each step of steps S604 to S608 are repeated.

The transportation method specifying means 102, after being notified of the completion of the transporting work by the transporting device 103 in step S607, may return to step S604 from step S608, or may return to step S604 from step S608 before the completion of the transporting work and then transmit the information in step S606 after being notified that the transporting work has completed.

This is the flow of the article transporting process in the article transporting robot and the article transporting system 10. The article transporting process will now be explained using a specific example. A case of clearing away the cup (cup without leftover drink (dirty)) after meal is given by way of example.

First, the user directly inputs the transporting work of the cup with respect to the article transporting robot 50 or the article transporting system to the robot 50 and commands the robot 50, or uses the operation terminal 403 to command the article transporting system. When the article transporting robot 50 or the article transporting system 10 receives the work command, the state recognizing means 101 recognizes the cup placed in the living space, and recognizes the state of the cup, and transmits the recognized result to the transportation method specifying means 102 (step S601)

The recognition of the cup is performed using the camera 502 and the like, as described above. If it is difficult to find the cup, it is directly input to the robot 50 or is input to the article transporting system using the operation terminal 403 to allow the user to specify the approximate location of the cup to be transported. When the approximate position of the cup is specified, the recognition of the cup is facilitated. The recognition of the state of the cup is performed using the reflectance parameter, as described above. In this example, the state of the cup is recognized as "without leftover drink" (dirty).

After receiving the recognized result, the transportation method specifying means 102 references the transporting information database 104 to search for the transporting data related to the cup (steps S602, S603). When the transporting data shown in FIG. 5 is found, the transporting basic data corresponding to the state of "without leftover drink" (dirty) is searched (steps S604, S605).

When the transporting basic data corresponding to the state of "without leftover drink" (dirty) is found, the transportation method specifying means 102 acquires the transportation method (orientation: upward, speed: free) and the transporting place (dishwasher Dw) described therein, and transmits the information to the transporting device 103 (step S606).

The transporting device 103 that has received the information of the transportation method and the transporting place transports the cup in the "without leftover drink" (dirty) state to the dishwasher Dw in the upward orientation and at a most suitable speed according to the transportation method and the transporting place (step S607).

The transportation method specifying means 102 determines whether or not the information regarding the next state is described in the transporting basic data acquired in step S606 (step S608). Since it is described as "clean", the transportation method specifying means 102 searches for and acquires the transporting basic data corresponding to the "clean" state (steps S604, S605).

The transportation method specifying means 102 acquires the transportation method (orientation: free, speed: free) and the transporting place (cupboard Cb) corresponding to the newly acquired "clean" state, and transmits the information to the transporting device 103 (step S606). Here, the transportation method specifying means 102 waits for the cup to have been washed by the dishwasher Dw and transmits the information. The dishwasher Dw may notify the transportation method specifying means 102 that washing of the cup by the dishwasher Dw is finished.

The transporting device 103 that has received the information of the transportation method and the transporting place, transports the cup in the "clean" state according to the transportation method and the transporting place from the dishwasher Dw to the cupboard Cb at a most suitable orientation and most suitable speed (step S607).

The transportation method specifying means 102 further determines whether or not the information regarding the next state is described in the transporting basic data. Since the information regarding the next state is not described, the transporting process is terminated.

According to the article transporting robot or the article transporting system 10, the article can be most-suitably transported by the transporting device 103 since the state of the article that changes from time to time is recognized by the state recognizing means 101 and the transportation method most-suitable for the state of the article is specified by the transportation method specifying means 102 according to the recognized result.

By arranging the transporting information database 104 that stores the transporting basic data in which the relevant state and the transporting operation and/or transporting place are corresponded for every state of each article, the transportation method specifying means 102 can accurately specify the transportation method corresponding to the state of the article.

As shown in FIG. 5, by further including the information regarding the next state of the relevant article that may change as a result of the article transported to the transporting place by the transporting device 103 in the transporting basic data stored in the transporting information database 104, a plurality of transporting works are continuously and automatically performed on the article. As a result, the command of the transporting work of the article made by the user is simplified and the user-friendliness is enhanced.

In the embodiment, the transporting information database 104 is the database for storing the transporting basic data in which the state and the transporting operation and/or transporting place are corresponded for every state of each article. However, the transporting information database 104 is not limited thereto, and may be a knowledge base for storing the knowledge for specifying the most suitable transportation method corresponding to the state. In this case, the transportation method specifying means 102 is configured as an inference engine for specifying the most suitable transportation method corresponding to the state using the knowledge base.

Figure 10A:
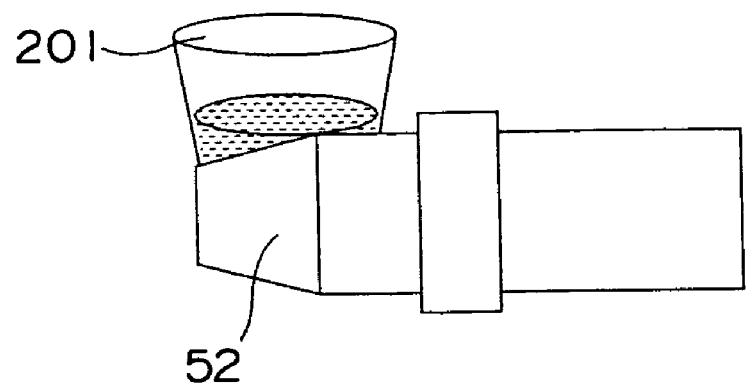
FIG. 10A is an explanatory view explaining the change of transportation method depending on a gripping method of a cup with water in the article transporting system or the article transporting robot according to the embodiment of the present invention.
Figure 10B:
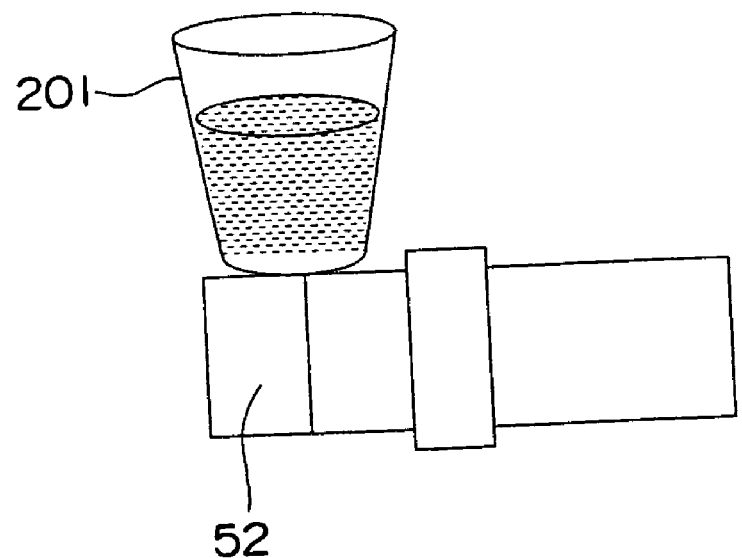
FIG. 10B is an explanatory view explaining the change of transportation method depending on the gripping method of the cup with water in the article transporting system or the article transporting robot according to the embodiment of the present invention.

The transportation method may be changed depending on the holding method of the article to be transported. This is effective when delivering and receiving the article to be transported with humans. The cup with water will be described in detail by way of example using FIG. 10A, FIG. 10B etc.

Different from when gripping and transporting the cup placed on the table Tb and the like, when a person hands over the article to the robot 50 and asks the article to be transported, the robot 50 might hold the article in a manner different from the usual. When the robot 50 shown in FIG. 8 transports the cup 201, the holding method is, normally, assumed to be the method of sandwiching the cup 201 with the hand 52 (refer to FIG. 10A). However, when the person hands over the article to the robot 50, the robot 50 does not grip the article with hand 52, but for example, may place the cup 201 on the hand 52 (refer to FIG. 10B).

Therefore, the transporting information of the article such as shown in FIG. 10C is stored in the article information database 104. In FIG. 10C, "transporting place" is omitted. The article information database 104 stores the "holding method of the article" as "state". That is, the holding method of a cup that contains contents such as water takes at least two methods of "gripping with hand 52" or "placing on hand 52". The holding method may take various methods other than the above but the following explanation is limited on the two methods for the sake of simplicity.

When the robot 50 holds the cup 201 by "gripping with hand 52", the cup 201 is considered to be stably held. The operation information for such state is set to be "upward" for orientation and "medium speed" for speed. When the human hands over the cup 201 to the robot 50 and the cup 201 is held by "placing on hand 52", the cup 201 is considered to be in an unstable state. The operation information for such state is set to be "upward" for orientation and "low speed" for speed, and slow transporting operation is performed so as not to drop the cup 201.

Even if the holding method of the article is changed, the article transporting robot and the article transporting system of the present embodiment can most suitably transport the article that may take wide variety of states.

The transportation method may be changed depending on the temperature of the article to be transported. This will be explained in detail using FIG. 10D using a china cup containing water by way of an example.

The transporting information of article such as shown in FIG. 10D is stored in the article information database 104. Normally, since the china cup with water is not dangerous, the operation does not need to be performed very slowly. When the water temperature of the water in the china cup is not relatively high (specifically, lower than 40° C.), and if there is no risk of burn etc. even if the water spills out from the china cup by any possibility, the orientation is set to "upward" and the speed to "medium speed" for the operation information. When the water temperature of the water in the china cup is sufficiently high (specifically, higher than or equal to 40° C.) and the robot 50 holds the china cup with hand 52 by "placing on hand" when the china cup is handed over from human, if there is a danger of burn etc. if water (hot water) spills out from the china cup by any possibility, the orientation is set to "upward" and the speed to "low speed" for the operation information, and slow transporting operation is performed so as not to spill hot water, or the content.

The known sensing means such as an infrared sensor is used to detect the temperature of the content.

According to the present embodiment, most suitable transportation is performed even if the hot water is cooled.

As one example, "low speed" is the movement at less than or equal to 2 km/h, and "medium speed" is the movement at less than or equal to 4 km/h.

Further, the robot 50 may of course switch the holding method. That is, when transportation of the cup with water is performed at the holding method of "placing on hand 52" but receives a different transportation command from the user, the robot may change to the holding method of "grip with hand 52" and increase the transporting speed. Such command from the user may be executed by attaching a microphone in the living space where the robot 50 performs the transporting work, and voice-recognizing the voice information collected by the microphone.

By properly combining the arbitrary embodiments of the aforementioned various embodiments, the effects possessed by the embodiments can be produced.

As explained above, with the present invention, the article may be transported, by recognizing the state of the article, in the transportation method corresponding to the state of the article, and thus, the present invention allows transportation of the article that may take wide variety of states in a most appropriate manner, and is effective for the article transporting robot and the article transporting system including various robots used in the living space.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An article transporting robot for transporting an article in which an ID of the article in a living space is same but the article has different transportation methods in accordance with conditions of the article, the article transporting robot comprising:

a condition recognizing means for recognizing the condition of the article to be transported;

a transportation method specifying means for specifying the transportation method of the article according to the condition of the article recognized by the condition recognizing means;

a transporting device for transporting the article to be transported according to the transportation method specified by the transportation method specifying means; and a transporting information database for storing transporting information corresponding the condition and the transporting operation of the mounted or accommodated object, for every mounting or accommodating condition of the object of each article, wherein the transporting information further includes information regarding a next condition of the article changed as a result transporting the article to a transporting place by the transporting device, the transportation method specifying means specifies the transporting information corresponding to the condition of the article with reference to the transporting information database, and after selecting the transporting information corresponding to the condition of the recognized article, further selects different information corresponding to the next condition based on the information on the next condition contained in the selected transporting information, and the transporting device further transports the article according to the different transporting information when the different transporting information is selected.

2. The article transporting robot according to claim 1, wherein the condition recognizing means recognizes whether or not another article is stacked on the article to be transported.

3. The article transporting robot according to claim 1, wherein, depending on the condition of the article, the transportation method of the article and the transporting location change.

4. The article transporting robot according to claim 1, further comprising:

a holding device for holding the article, wherein the article is transported while the article is being held by the holding device.

5. The article transporting robot according to claim 1, wherein the article to be transported is a dish, the article transporting robot functions as a robot that performs a work of clearing away the dish after meal, and the transporting location and the transportation method change between a condition in which the dish is dirty and a condition in which the dish is clean.

6. An article transporting robot for transporting an article in which an ID of the article in a living space is the same but the article having different transportation methods in accordance with conditions of the article, the article transporting robot comprising:

a condition recognizing means for recognizing the condition of the article to be transported;

a transportation method specifying means for specifying the transportation method of the article according to the condition of the article recognized by the condition recognizing means; and a transporting device for transporting the article to be transported according to the transportation method specified by the transportation method specifying means; wherein the article to be transported has a function of placing thereon or accommodating therein an object, and the condition recognizing means recognizes a condition whether or not the article to be transported is placing thereon or accommodating therein the object.

7. The article transporting robot according to claim 6, wherein the condition recognizing means recognizes whether or not another article is stacked on the article to be transported.

8. The article transporting robot according to claim 6, wherein, depending on the condition of the article, the transportation method of the article and the transporting location change.

9. The article transporting robot according to claim 6, further comprising:
a holding device for holding the article, wherein
the article is transported while the article is being held by the holding device.

10. The article transporting robot according to claim 6, wherein
the article to be transported is a dish,
the article transporting robot functions as a robot that performs a work of clearing away the dish after meal, and
the transporting location and the transportation method change between a condition in which the dish is dirty and a condition in which the dish is clean.

* * * * *

UNITED STATES PATENT AND TRADEMARK OFFICE
CERTIFICATE OF CORRECTION

PATENT NO. : 7,269,479 B2
APPLICATION NO. : 11/699342
DATED : September 11, 2007
INVENTOR(S) : Shusaku Okamoto et al.

It is certified that error appears in the above-identified patent and that said Letters Patent is hereby corrected as shown below:

On the title page, right column, item (56), References Cited, under OTHER PUBLICATIONS, the following reference should be added:

--H. Murase, "*Image Recognition in Eigenspace Method*", Technical Review and Future Views in Computer Vision, Shin Gijutu Communications, pp. 206-218.--

Signed and Sealed this

Twentieth Day of May, 2008

JON W. DUDAS
*Director of the United States Patent and Trademark Office*